US012595400B2

(12) United States Patent
Caruso Dailey et al.

(10) Patent No.: US 12,595,400 B2
(45) Date of Patent: Apr. 7, 2026

(54) COMPOSITIONS AND ADHESIVE ARTICLES INCLUDING POROUS POLYMERIC PARTICLES AND METHODS OF COATING SUBSTRATES

(71) Applicant: 3M INNOVATIVE PROPERTIES COMPANY, St. Paul, MN (US)

(72) Inventors: Mary M. Caruso Dailey, Maplewood, MN (US); Ying Lin, Woodbury, MN (US); John C. Hulteen, Afton, MN (US); Ibrahim A El Hedok, Woodbury, MN (US); Hassan Sahouani, Hastings, MN (US); Yongshang Lu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 540 days.

(21) Appl. No.: 17/693,477

(22) Filed: Mar. 14, 2022

(65) Prior Publication Data

US 2022/0195264 A1    Jun. 23, 2022

Related U.S. Application Data

(63) Continuation of application No. 15/555,986, filed as application No. PCT/US2016/018844 on Feb. 22, 2016, now abandoned.

(Continued)

(51) Int. Cl.
*C09J 11/08* (2006.01)
*C08L 71/02* (2006.01)
(Continued)

(52) U.S. Cl.
CPC .............. *C09J 11/08* (2013.01); *C08L 71/02* (2013.01); *C09D 7/45* (2018.01); *C09D 7/65* (2018.01);
(Continued)

(58) Field of Classification Search
None
See application file for complete search history.

(56) References Cited

U.S. PATENT DOCUMENTS 4,684,678 A    8/1987  Schultz
6,048,908 A    4/2000  Kitagawa
(Continued)

FOREIGN PATENT DOCUMENTS

CN        102911544      2/2013
EP          1167056      1/2002
(Continued)

OTHER PUBLICATIONS

Oertel, Polyurethane Handbook, 15, (1985).
(Continued)

*Primary Examiner* — Chinessa T. Golden
(74) *Attorney, Agent, or Firm* — Vincent Pham

(57)                ABSTRACT

Compositions are provided that include a coating and porous polymeric particles disposed in the coating. Adhesive articles are also provided including a substrate and a composition disposed on a first major surface of the substrate. The composition includes an adhesive and porous polymeric particles disposed in the adhesive. Further, a method of coating a substrate is provided including providing a composition, providing a substrate having a surface, and applying the composition on the surface of the substrate. The compositions and adhesive articles can be applied to wet substrates or dry substrates.

14 Claims, 3 Drawing Sheets

Related U.S. Application Data

(60) Provisional application No. 62/129,058, filed on Mar. 6, 2015.

(51) Int. Cl.

| | |
|---|---|
| *C09D 7/45* | (2018.01) |
| *C09D 7/65* | (2018.01) |
| *C09D 201/00* | (2006.01) |
| *C09J 7/20* | (2018.01) |
| *C09J 7/38* | (2018.01) |
| *C09J 133/02* | (2006.01) |
| *C09J 163/00* | (2006.01) |
| *C09J 175/08* | (2006.01) |
| *C09J 201/00* | (2006.01) |
| *C09D 7/40* | (2018.01) |

(52) U.S. Cl.
CPC .............. *C09D 201/00* (2013.01); *C09J 7/20* (2018.01); *C09J 7/385* (2018.01); *C09J 133/02* (2013.01); *C09J 163/00* (2013.01); *C09J 175/08* (2013.01); *C09J 201/00* (2013.01); *C09D 7/66* (2018.01); *C09J 2301/302* (2020.08); *C09J 2301/304* (2020.08); *C09J 2301/408* (2020.08); *C09J 2421/00* (2013.01); *C09J 2433/00* (2013.01); *C09J 2471/00* (2013.01); *C09J 2475/00* (2013.01); *C09J 2483/00* (2013.01)

(56) References Cited

U.S. PATENT DOCUMENTS

| | | |
|---|---|---|
| 2003/0103120 A1 | 6/2003 | Merkel |
| 2007/0027232 A1 | 2/2007 | Walsh |
| 2010/0104647 A1 | 4/2010 | Ting |
| 2011/0123456 A1 | 5/2011 | Pandit |
| 2013/0118773 A1 | 5/2013 | Liu |
| 2017/0327998 A1 | 11/2017 | El Hedok |

FOREIGN PATENT DOCUMENTS

| | | |
|---|---|---|
| EP | 1371704 | 12/2003 |
| JP | 02215011 | 8/1990 |
| JP | 06172541 | 6/1994 |
| JP | 2001-334596 | 12/2001 |
| JP | 2002-371257 | 12/2002 |
| JP | 2010-532397 | 10/2010 |
| JP | 2011-512443 | 4/2011 |
| JP | 2012-512285 | 5/2012 |
| JP | 2014-062174 | 4/2014 |
| JP | 2017-531740 | 10/2017 |
| WO | WO 2007-075442 | 7/2007 |
| WO | WO 2007-075508 | 7/2007 |
| WO | WO 2007-146722 | 12/2007 |
| WO | WO 2009-006901 | 1/2009 |
| WO | WO2009-102933 | 8/2009 |
| WO | WO 2010-069333 | 6/2010 |
| WO | WO2013-077981 | 5/2013 |
| WO | WO 2014-186328 | 11/2014 |
| WO | WO 2014-186336 | 11/2014 |
| WO | WO2015-010016 | 1/2015 |
| WO | WO2016-105997 | 6/2016 |

OTHER PUBLICATIONS

Pour-Ali, "In situ synthesis of polyaniline-camphorsulfonate particles in an epoxy matrix for corrosion protection of mild steel in NaCl solution", Corrosion Science, vol. 85, 2014, pp. 204-214.
International Search Report for PCT International Application No. PCT/US2016/018844, mailed on May 30, 2016, 6 pages.

10.0μm 5.00μm

COMPOSITIONS AND ADHESIVE ARTICLES INCLUDING POROUS POLYMERIC PARTICLES AND METHODS OF COATING SUBSTRATES

BACKGROUND

Various polymeric particles have been prepared. Some of these have been used, for example, as ion exchange resins or other chromatographic resins. Others have been used, for example, to adsorb and/or deliver different active agents. Such particles are described, for example, in U.S. Patent Application 2010/0104647 (Ting), U.S. Patent Application Publication 2011/0123456 (Pandidt et al.), U.S. Pat. No. 6,048,908 (Kitagawa), and Patent Application Publications WO 2013/077981 (Sahouani), WO 2007/075508 (Rasmussen et al.), and WO 2007/075442 (Ramussen et al.).

FIELD

Compositions and adhesive articles including polymeric particles are provided, for instance, for use in coating a substrate.

SUMMARY

Compositions and adhesive articles including polymeric particles are provided, as are methods of coating substrates. More particularly, the compositions and adhesive articles can be used for coating substrates that are either wet or dry.

In a first aspect, a composition is provided. The composition includes a coating and porous polymeric particles disposed in the coating. The porous polymeric particles comprise a polymerized product of a reaction mixture including a first phase and a second phase dispersed in the first phase. The first phase includes a nonionic surfactant and a compound of Formula (I):

$$HO(-CH_2-CH(OH)-CH_2-O)_n-H \qquad (I)$$

In Formula (I), n is an integer equal to at least 1. A volume of the first phase is greater than a volume of the second phase. The second phase includes a poly(propylene glycol) having a weight average molecular weight of at least 500 grams/mole and a monomer composition including a monomer of Formula (II):

$$CH_2=C(R^1)-(CO)-O[-CH_2-CH_2-)]_p-$$
$$(CO)-C(R^1)=CH_2 \qquad (II)$$

In Formula (II), p is an integer equal to at least 1 and R' is a hydrogen or alkyl. The poly(propylene glycol) is removed from the polymerized product to provide the porous polymeric particles.

In a second aspect, an adhesive article is provided. The adhesive article includes a substrate and a composition disposed on a first major surface of the substrate. The composition includes an adhesive and porous polymeric particles according to the first aspect disposed in the adhesive.

In a third aspect, a method of coating a substrate is provided. The method includes providing a composition; providing a substrate having a surface; and applying the composition on the surface of the substrate. The composition includes a coating and porous polymeric particles according to the first aspect disposed in the coating.

Figure 1:
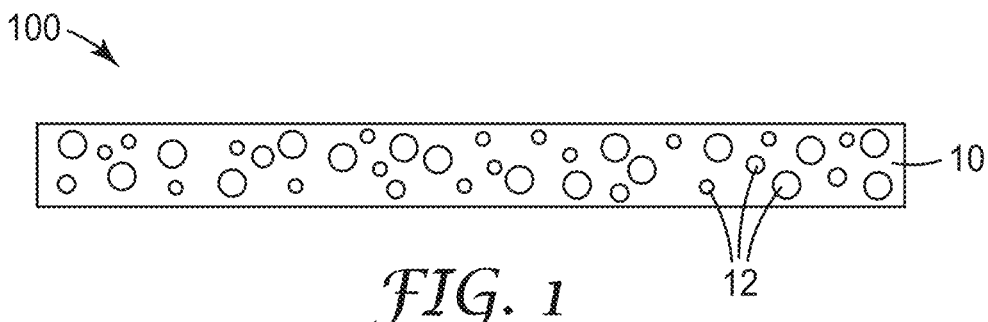
FIG. 1 is a schematic of an exemplary composition according to the disclosure.

While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

It is often desired to field coat substrates (e.g., steel structures); however, the presence of moisture on the substrate surface can significantly reduce adhesion of the coating. As a result, an applicator has to wait until, for instance, the air temperature is a minimum of 5 degrees above the dew point for evaporation of moisture from the surface of the substrate. Compositions and adhesive articles including polymeric particles are provided according to the present disclosure, as are methods of coating substrates. More particularly, it has been discovered that the compositions and adhesive articles can be used for coating substrates that are either wet or dry.

The porous polymeric particles have voids or free volume. The voids in the porous polymeric particles allow fluid to be absorbed from the coating or adhesive in which the porous polymeric particles are disposed. Without wishing to be bound by theory, it is believed that the porous polymeric particles assist in transporting fluid through the compositions or adhesive articles to evaporate fluid out of the compositions or adhesive articles. The porous polymeric particles have pores on their outer surfaces and, at least in some embodiments, can have hollow interiors. The terms "porous polymeric particle" and "polymeric particle" are used interchangeably.

As used throughout this specification and the appended embodiments, the words "suitable" and "preferably" refer to embodiments of the disclosure that may afford certain benefits under certain circumstances. Other embodiments may also be suitable; however, under the same or other circumstances. Furthermore, the recitation of one or more suitable embodiments does not imply that other embodiments are not useful, and is not intended to exclude other embodiments from the scope of the disclosure.

As used throughout this specification and the appended embodiments, the term "comprises" and variations thereof do not have a limiting meaning where these terms appear in the description and claims.

As used throughout this specification and the appended embodiments, the recitation of numerical ranges by endpoints includes all numbers subsumed within that range (e.g. 1 to 5 includes 1, 1.5, 2, 2.75, 3, 3.8, 4, and 5).

Unless otherwise indicated throughout this specification and the appended embodiments, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, including the claims:

Glossary

The term "a", "an", and "the" are used interchangeably with "at least one" to mean one or more of the elements being described.

The term "and/or" means either or both. For example "A and/or B" means only A, only B, or both A and B.

The term "coating" relating to a composition comprising porous polymeric particles disposed in the coating, means a material that is capable of adhering to a material surface, such as a substrate surface. Exemplary coatings include for instance and without limitation epoxies, acrylics, urethanes, silicones, and rubbers. The coating may comprise a non-tacky surface or a tacky surface (e.g., a hot melt adhesive and/or a pressure sensitive adhesive).

The term "hydrophilic" refers to monomers or particles having polar regions.

The term "hydrophobic" refers to monomers or particles having non-polar regions.

The term "moisture" refers to water or to a water-containing solution.

The term "monomer composition" refers to that portion of a polymerizable composition that includes the monomers and only the monomers. More specifically, the monomer composition includes at least the first monomer of Formula (II).

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "reaction mixture" includes, for example, the monomer composition, the poly(propylene glycol), any other components such as those included in the first phase and the second phase described below. Some of the components in the reaction mixture but may not undergo a chemical reaction but can influence the chemical reaction and the resulting polymeric material.

The term "substrate" refers to any material comprising at least one surface on which a coating may be applied. Exemplary substrates include for instance and without limitation tape backings, release liners, and structural materials such as metal, plastic, glass, concrete, and wood.

The term "wet" with respect to a surface refers to the presence of moisture on the surface. A minimum amount of moisture is condensation on a portion of the surface, which can be determined visually or via contact with the surface (e.g., wiping moisture from the surface with an absorbent material). A maximum amount of moisture is about 2 milliliters of moisture per 103 square centimeters of substrate surface area.

In a first aspect, a composition is provided. The composition includes a coating and porous polymeric particles disposed in the coating. Referring to FIG. 1, a cross-sectional schematic of a composition 100 is shown, in which a plurality of porous polymeric particles 12 are disposed in a coating 10. In certain embodiments, the composition is a self-supporting material. In certain embodiments, the composition is disposed on a substrate, such as one or more backing layers and/or release liners.

The porous polymeric particles comprise a polymerized product of a reaction mixture including a first phase and a second phase dispersed in the first phase. The first phase includes a nonionic surfactant and a compound of Formula (I):

$$HO(-CH_2-CH(OH)-CH_2-O)_n-H \qquad (I)$$

FOrmula (I), n is an integer equal to at least 1. A volume of the first phase is greater than a volume of the second phase. The second phase includes a poly(propylene glycol) having a weight average molecular weight of at least 500 grams/mole and a monomer composition including a monomer of Formula (II):

$$CH_2=C(R^1)-(CO)-O[-CH_2-CH_2-O]_p-$$
$$(CO)-C(R^1)=CH_2 \qquad (II)$$

In Formula (II), p is an integer equal to at least 1 and $R^1$ is a hydrogen or alkyl. The poly(propylene glycol) is removed from the polymerized product to provide the porous polymeric particles.

The variable p in Formula (II) is an integer no greater than 30, no greater than 20, no greater than 16, no greater than 12, or no greater than 10. The number average molecular weight of the ethylene oxide portion of the monomer (i.e., the group $-[CH_2CH_2-O]_p-$) is often no greater than 1200 grams/mole, no greater 1000 grams/mole, no greater than 800 grams/mole, no greater than 1000 grams, mole, no greater than 600 grams/mole, no greater than 400 grams/mole, no greater than 200 grams/mole, or no greater than 100 grams/mole. The group $R^1$ in Formula (I) is hydrogen or methyl.

Suitable first monomers of Formula (II) are commercially available from Sartomer (Exton, PA, USA) under the trade designation SR206 for ethylene glycol dimethacrylate, SR231 for diethylene glycol dimethacrylate, SR205 for triethylene glycol dimethacrylate, SR210 and SR210A for polyethylene glycol dimethacrylate, SR259 for polyethylene glycol (200) diacrylate, SR603 and SR344 for polyethylene glycol (400) di(meth)acrylate, SR252 and SR610 for polyethylene glycol (600) di(meth)acrylate, and SR740 for poly-ethylene glycol (1000) dimethacrylate.

The reaction mixture used to form the porous polymeric particles also includes a poly(propylene glycol) having a weight average molecular weight of at least 500 grams/mole. The polypropylene glycol functions as a porogen that gets partially entrained within the polymerized product as it forms from the monomer composition. Because the poly-propylene glycol has no polymerizable group, this material can be removed after formation of the polymerized product. Pores (i.e., void volume or free volume) are created when the previously entrained polypropylene glycol is removed. The polymeric particles resulting from the removal of the entrained polypropylene glycol are porous. In certain embodiments, at least some of these porous polymeric particles can have hollow centers, and thus be in the form of hollow beads. The presence of pores or the presence of both pores and hollow centers make the polymeric particles well suited for absorbing and wicking fluids, as well as holding active agents.

Any suitable molecular weight of poly(propylene glycol) can be used as the porogen. The molecular weight can affect the size of the pores that are formed in the polymeric particles. That is, the pore size tends to increase with the molecular weight of the poly(propylene glycol). The weight average molecular weight is often at least 500 grams/mole, at least 800 grams/mole, or at least 1000 grams/mole. The weight average molecular weight of the poly(propylene glycol) can be up to 10,000 gram/mole or greater. For ease of use, a poly(propylene glycol) that is a liquid at room temperature is often selected. Poly(propylene glycol) having a weight average molecular weight up to about 4000 grams/mole or 5000 grams/mole tends to be a liquid at room temperature. Poly(propylene glycol) that is not a liquid at room temperature can be used if it is initially dissolved in a suitable organic solvent such as an alcohol (for example, ethanol, n-propanol, or iso-propanol). The weight average molecular weight of the poly(propylene glycol) is often in a range of 500 to 10,000 grams/mole, in a range of 1000 to 10,000 grams/mole, in a range of 1000 to 8000 grams/mole, in a range of 1000 to 5000 grams/mole, in a range of 1000 to 4000 grams/mole.

In many embodiments of the first aspect, the reaction mixture used to form the porous polymeric particles includes (a) a first phase and (b) a second phase dispersed in the first phase, wherein a volume of the first phase is greater than a volume of the second phase. The first phase contains (i) a compound of Formula (I)

$$HO[-CH_2-CH(OH)-CH_2-O]_n-H \qquad (I)$$

where the variable n is an integer equal to at least 1, and (ii) a nonionic surfactant. The second phase contains (i) a monomer composition comprising the monomer of Formula (I) as described above and (ii) a poly(propylene glycol) having a weight average molecular weight of at least 500 grams/mole. The second phase of the reaction mixture is dispersed in the first phase of the reaction mixture and the volume of the first phase is greater than the volume of the second phase. That is, the first phase can be considered to be the continuous phase and the second phase can be consid-ered to be the dispersed phase within the continuous phase. The first phase provides a non-polymerizable medium for suspending the second phase as droplets within the reaction mixture. The second phase droplets include i) a monomer composition that can undergo polymerization and ii) a porogen, which is poly(propylene glycol) having a weight average molecular weight of at least 500 grams/mole. The monomer of Formula (II) in the second phase is typically not miscible with the first phase.

The first phase of the reaction mixture includes (i) the compound of Formula (I) and (ii) a nonionic surfactant. The first phase is typically formulated to provide a suitable viscosity and volume for dispersion of the second phase as droplets within the first phase. If the viscosity of the first phase is too high, it can be difficult to provide the requisite shear to disperse the second phase. If the viscosity is too low, however, it can be difficult to suspend the second phase and/or to form polymeric particles that are relatively uni-form and well separated from each other.

Suitable compounds of Formula (I) typically have a value of n that is in a range of 1 to 20, in a range of 1 to 16, in a range of 1 to 12, in a range of 1 to 10, in a range of 1 to 6, or in a range of 1 to 4. In many embodiments, the compound of Formula (I) is glycerol where the variable n is equal to 1. Other example compounds of Formula (I) are diglycerol (n is equal to 2), polyglycerol-3 (n is equal to 3), polyglycerol-4 (n is equal to 4), or polyglycerol-6 (n is equal to 6). The polyglycerols, which can be referred to as polyglycerins, are often a mixture of materials with varying molecular weight (i.e., materials with different values for n). Polyglycerols, diglycerol, and glycerol are commercially available, for example, from Solvay Chemical (Brussels, Belgium) and Wilshire Technologies (Princeton, NJ, USA).

In addition to the compound of Formula (I), the first phase includes a nonionic surfactant. The nonionic surfactant increases the porosity on the surface of the final polymeric particles. The first phase is typically free or substantially free of an ionic surfactant that could interfere with the polym-erization reaction of the monomers within the second phase. As used herein with reference to the ionic surfactant, the term "substantially free" means that no ionic surfactant is purposefully added to the first phase but may be present as a trace impurity in one of the other components in the first phase. Any impurity is typically present in an amount no greater than 0.5 weight percent, no greater than 0.1 weight percent, or no greater than 0.05 weight percent, or no greater than 0.01 weight percent based on a total weight of the first phase.

Any suitable nonionic surfactant can be used in the first phase. The nonionic surfactant often has hydroxyl group or ether linkages (for example, $-CH_2-O-CH_2-$) in one portion of the molecule that can hydrogen bond with other components of the reaction mixture. Suitable nonionic sur-factants include, but are not limited to, alkyl glucosides, alkyl glucamides, alkyl polyglucosides, polyethylene glycol alkyl ethers, block copolymers of polyethylene glycol and polypropylene glycol, and polysorbates. Examples of suit-able alkyl glucosides include, but are not limited to, octyl glucoside (also referred to as octyl-beta-D-glucopyranoside) and decyl glucoside (also referred to as decyl-beta-D-glu-copyranoside). Examples of suitable alkyl glucamides include, but are not limited to, octanoyl-N-methylgluc-amide, nonanoyl-N-methylglucamide, and decanoyl-N-methylglucamide. These surfactants can be obtained, for example, from Sigma Aldrich (St. Louis, MO, USA) or Spectrum Chemicals (New Brunswick, NJ, USA). Examples of suitable alkyl polyglucosides include, but are not limited to, those commercially available from Cognis Corporation (Monheim, Germany) under the trade designation APG (for example, APG 325) and those commercially available from Dow Chemical (Midland, MI, USA) under the trade desig-nation TRITON (for example, TRITON BG-10 and TRI-TON CG-110). Examples of polyethylene glycol alkyl ethers include, but are not limited to, those commercially available under the trade designation BRIJ (for example, BRIJ 58 and BRIJ 98) from Sigma Aldrich (St. Louis, MO, USA). Examples of block copolymers of polyethylene glycol and polypropylene glycol include, but are not limited to, those commercially available under the trade designation PLURONIC from BASF (Florham Park, NJ, USA). Examples of polysorbates include, but are not limited, to those commercially available under the trade designation TWEEN from ICI American, Inc. (Wilmington, DE, USA).

The surfactant can be present in the first phase in any suitable amount. Often, the surfactant is present in an amount equal to at least 0.5 weight percent, at least 1 weight percent, or at least 2 weight percent based on a total weight of the first phase. The surfactant can be present in an amount up to 15 weight percent, up to 12 weight percent, or up to 10 weight percent based on a total weight of the first phase. For example, the surfactant is often present in the first phase in an amount in a range of 0.5 to 15 weight percent, in a range of 1 to 12 weight percent, in a range of 0.5 to 10 weight percent, or in a range of 1 to 10 weight percent based on the total weight of the first phase.

Optionally, water or an organic solvent that is miscible with the compound of Formula (I) can be present in the first reaction mixture. Suitable organic solvents include, for example, an alcohol such as methanol, ethanol, n-propanol, or isopropanol. The amount of any optional water or organic solvent is selected so that the desired viscosity of the first phase can be achieved. The amounts of the optional water or organic solvent is often no greater than 10 weight percent, no greater than 5 weight percent, or no greater than 1 weight percent based on the total weight of the first phase. If higher amounts of water are included, the porosity may decrease. In some embodiments, the first phase is free or substantially free of the optional water or organic solvent. As used herein with reference to the optional water or organic solvent, the term "substantially free" means that water or organic solvent is not purposely added to the first phase but may be present as an impurity in one of the other components in the first phase. For example, the amount of the optional water or organic solvent is less than 1 percent, less than 0.5 weight percent, or less than 0.1 weight percent based on a total weight of the first phase.

The reaction mixture includes a second phase dispersed in the first phase. The second phase includes both i) a monomer composition and ii) a poly(propylene glycol) having a weight average molecular weight of at least 500 grams/mole. The monomer composition is polymerized in the second phase to from the polymeric particles. The polypropylene glycol functions as a porogen that gets partially entrained within the polymerized product as it is formed from the monomer composition.

The volume of the first phase is greater than the volume of the second phase. The volume of the first phase is sufficiently large compared to the volume of the second phase so that the second phase can be dispersed in the form of droplets within the first phase. Within each droplet, the monomer composition is polymerized to form a polymerized product. To form particles from the second phase, the volume ratio of the first phase to the second phase is typically at least 2:1. As the volume ratio increases (for example, when the ratio is at least 3:1, at least 4:1, or at least 5:1), beads can be formed that have a relatively uniform size and shape. If the volume ratio is too large, however, the reaction efficiency is diminished (i.e., a smaller amount of polymeric particles is produced). The volume ratio is generally no greater than 25:1, no greater than 20:1, no greater than 15:1, or no greater than 10:1.

In some embodiments, the first monomer of Formula (II) as described above is the only monomer in the monomer composition of the second phase. In other embodiments, the first monomer of Formula (II) can be used in combination with at least one second monomer. The second monomer has a single free radically polymerizable group such as an ethylenically unsaturated group, which is often a (meth) acryloyl group of formula $H_2C\!\!=\!\!CR^1\!\!-\!\!(CO)\!\!-$ where $R^1$ is hydrogen or methyl. Suitable second monomers are not miscible with the first phase but can be miscible or not miscible with the first monomer of Formula (II). The second monomer is often added to alter the hydrophobicity or hydrophilicity of the porous polymeric material. The addition of these monomers can, however, diminish the porosity of the polymeric particles and/or increase the size of the polymeric particles.

Some example second monomers are of Formula (III).

$$CH_2\!\!=\!\!CR^1\!\!-\!\!(CO)\!\!-\!\!O\!\!-\!\!Y\!\!-\!\!R^2 \qquad (III)$$

In this formula, group $R^1$ is hydrogen or methyl. In many embodiments, $R^1$ is hydrogen. Group Y is a single bond, alkylene, oxyalkylene, or poly(oxyalkylene). Group $R^2$ is a carbocyclic group or heterocyclic group. These second monomers tend to be miscible with the first monomer of Formula (I) in the second phase but are not miscible with the first phase.

As used herein, the term "alkylene" refers to a divalent group that is a radical of an alkane and includes groups that are linear, branched, cyclic, bicylic, or a combination thereof. As used herein, the term "oxyalkylene" refers to a divalent group that is an oxy group bonded directly to an alkylene group. As used herein, the term "poly(oxyalkylene)" refers to a divalent group having multiple oxyalkylene groups. Suitable Y alkylene and oxyalkylene groups typically have 1 to 20 carbon atoms, 1 to 16 carbon atoms, 1 to 12 carbon atoms, 1 to 10 carbon atoms, 1 to 8 carbon atoms, 1 to 6 carbon atoms, or 1 to 3 carbon atoms. The oxyalkylene is often oxyethylene or oxypropylene. Suitable poly(oxyalkylene) groups typically have 2 to 20 carbon atoms, 2 to 16 carbon atoms, 2 to 12 carbon atoms, 2 to 10 carbon atoms, 2 to 8 carbon atoms, 2 to 6 carbon atoms, or 2 to 4 carbon atoms. The poly(oxyalkylene) is often poly (oxyethylene), which can be referred to as poly(ethylene oxide) or poly(ethylene glycol).

Carbocyclic $R^2$ groups can have a single ring or can have multiple rings such as fused rings or bicylic rings. Each ring can be saturated, partially unsaturated, or unsaturated. Each ring carbon atom can be unsubstituted or substituted with alkyl groups. Carbocyclic groups often have 5 to 12 carbon atoms, 5 to 10 carbon atoms, or 6 to 10 carbon atoms. Examples of carbocyclic groups include, but are not limited to, phenyl, cyclohexyl, cyclopentyl, isobornyl, and the like. Any of these carbocyclic groups can be substituted with an alkyl group having 1 to 20 carbon atoms, 1 to 10 carbon atoms, 1 to 6 carbon atoms, or 1 to 4 carbon atoms. Heterocyclic $R^2$ groups can have a single ring or multiple rings such as fused rings or bicylic rings. Each ring can be saturated, partially unsaturated, or unsaturated. The heterocyclic group contains at least one heteroatom selected from oxygen, nitrogen, or sulfur. The heterocyclic group often has 3 to 10 carbon atoms and 1 to 3 heteroatoms, 3 to 6 carbon atoms and 1 to 2 heteroatoms, or 3 to 5 carbon atoms and 1 to 2 heteroatoms. Examples of heterocyclic rings include, but are not limited to, tetrahydrofurfuryl.

Exemplary monomers of Formula (III) for use as the second monomer include, but are not limited to, benzyl (meth)acrylate, 2-phenoxyethyl (meth)acrylate (commercially available from Sartomer under the trade designation SR339 and SR340), isobornyl (meth)acrylate, tetrahydrofurfuryl (meth)acrylate (commercially available from Sartomer under the trade designation SR285 and SR203), 3,3,5-trimethylcyclohexyl (meth)acrylate (commercially available from Sartomer under the trade designation CD421 and CD421A), and ethoxylated nonyl phenol acrylate (commercially available from Sartomer under then trade designation SR504, CD613, and CD612).

Other example second monomers are alkyl (meth)acrylates of Formula (IV).

$$CH_2=CR^1-(CO)-O-R^3 \tag{IV}$$

In Formula (IV), group $R^1$ is hydrogen or methyl. In many embodiments, $R^1$ is hydrogen. Group $R^3$ is a linear or branched alkyl having 1 to 20 carbon atoms, 1 to 10 carbon atoms, 1 to 6 carbon atoms, or 1 to 4 carbon atoms. These second monomers tend to be miscible with the first monomer of Formula (I) in the second phase but are not miscible with the first phase.

Examples of alkyl (meth)acrylates of Formula (IV) include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, 4-methyl-2-pentyl (meth)acrylate, 2-ethylhexyl (meth)acrylate, 2-mehtylhexyl (meth)acrylate, n-octyl (meth)acrylate, isooctyl (meth)acrylate, 2-octyl (meth)acrylate, isononyl (meth)acrylate, isoamyl (meth) acrylate, n-decyl (meth)acrylate, isodecyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth) acrylate, and heptadecanyl (meth)acrylate.

In some embodiments, the only monomers in the monomer composition are the first monomer of Formula (II) and the second monomer of Formula (III), Formula (IV), or both. Any suitable amounts of the first monomer and second monomer can be used provided that the monomer composition contains at least 10 weight percent of the first monomer of Formula (II). The addition of a second monomer of Formula (III), Formula (IV), or both tends to increase the hydrophobicity of the porous polymeric particles. The monomer composition often contains 10 to 90 weight percent of the first monomer and 10 to 90 weight percent of the second monomer based on a total weight of monomers in the monomer composition. For example, the second phase can contain 20 to 80 weight percent of the first monomer and 20 to 80 weight percent of the second monomer, 25 to 75 weight percent of the first monomer and 25 to 75 weight percent of the second monomer, 30 to 70 weight percent of the first monomer and 30 to 70 weight percent of the second monomer, or 40 to 60 weight percent of the first monomer and 40 to 60 weight percent of the second monomer based on a total weight of monomers in the monomer composition.

Depending on the final use of the polymeric particles prepared, it can be desirable to include at least one hydrophilic second monomer in the monomer composition. The addition of a hydrophilic second monomer tends to make the polymeric particles more suitable for applications where the particles will be exposed to aqueous-based materials such as aqueous-based samples. Additionally, the use of a hydrophilic second monomer allows the porous polymeric particles to be dispersed in water more easily during the preparation of the porous article using, for example, a wetlaid process. Hydrophilic second monomers are selected so that they are not miscible with the first phase. These monomers may or may not be miscible with the first monomer of Formula (II).

Some example hydrophilic second monomers are hydroxyl-containing monomers of Formula (V).

$$CH_2=CR^1-(CO)-O-R^4 \tag{V}$$

In Formula (V), group $R^1$ is hydrogen or methyl. In many embodiments, $R^1$ is hydrogen. Group $R^4$ is an alkyl substituted with one or more hydroxyl groups or a group of formula $-(CH_2CH_2O)_qCH_2CH_2OH$ where q is an integer equal to at least 1. The alkyl group typically has 1 to 10 carbon atoms, 1 to 6 carbon atoms, 1 to 4 carbon atoms, or 1 to 3 carbon atoms. The number of hydroxyl groups is often in a range of 1 to 3. The variable q is often in a range of 1 to 20, in a range of 1 to 15, in a range of 1 to 10, or in a range of 1 to 5. In many embodiments, the second monomer of Formula (IV) has a single hydroxyl group.

Example monomers of Formula (V) include, but are not limited to, 2-hydroxyethyl (meth)acrylate, 2-hydroxypropyl (meth)acrylate, 3-hydroxypropyl (meth)acrylate, and 4-hydroxybutyl (meth)acrylate), 2-hydroxylbutyl (meth)acrylate, polyethylene glycol mono(meth)acrylate (for example, monomers commercially available from Sartomer (Exton, PA, USA) under the trade designation CD570, CD571, and CD572), and glycol mono(meth)acrylate.

Other example hydrophilic second monomers are hydroxyl-containing monomers of Formula (VI).

$$CH_2=CR^1-(CO)-O-R^5-O-Ar \tag{VI}$$

In Formula (VI), group $R^1$ is hydrogen or methyl. In many embodiments, $R^1$ is hydrogen. Groups $R^5$ is an alkylene substituted with at least one hydroxyl group. Suitable alkylene groups often have 1 to 10 carbon atoms, 1 to 6 carbon atoms or 1 to 4 carbon atoms. The alkylene group $R^5$ can be substituted with 1 to 3 hydroxyl groups but is often substituted with a single hydroxyl group. The group Ar is an aryl group having 6 to 10 carbon atoms. In many embodiments, the Ar group is phenyl. One example monomer of Formula (VI) is 2-hydroxy-2-phenoxypropyl (meth)acrylate.

If the second monomer is of Formula (V) or (VI), which are hydroxyl-containing monomers, the amount of this monomer that can be combined with the first monomer of Formula (I) is often no greater than 2 weight percent based on a total weight of monomers in the monomer composition. If greater than about 2 weight percent of the second monomer of Formula (V) or (VI) is used, the resulting polymeric particles tend to have diminished porosity.

Other hydrophilic monomers can be used as the second monomers in larger quantities than the second monomers of Formula (V) or (VI) without diminishing the porosity of the resulting polymeric particles. For example, sulfonic acid-containing monomers of Formula (VII) can be included in the monomer composition along with the first monomer of Formula (II) or a salt thereof.

$$CH_2=CR^1-(CO)-O-R^6-SO_3H \tag{VII}$$

In Formula (VII), group $R^1$ is hydrogen or methyl. In many embodiments, $R^1$ is hydrogen. Group $R^6$ is an alkylene having 1 to 10 carbon atoms, 1 to 6 carbon atoms, or 1 to 4 carbon atoms. Examples of sulfonic acid-containing monomers of Formula (VII) include, but are not limited to, sulfoethyl (meth)acrylate and sulfopropyl (meth)acrylate. Depending on the pH conditions, these second monomers can impart an ionic (for example, anionic) character to the porous polymeric particles. The counter ion is often a cation of such as an alkali metal ion, an alkaline earth metal ion, an ammonium ion, or an alkyl substituted ammonium ions such as tetraalkyl ammonium ion.

If the second monomer is a sulfonic acid-containing monomer of Formula (VII), the monomer composition can contain up to 20 weight percent of this monomer based on a total weight of monomers in the monomer composition. In some embodiments, the only monomers in the monomer composition are the first monomer of Formula (II) and the second monomer of Formula (VII). The monomer composition often contains 80 to 99 weight percent of the first monomer of Formula (II) and 1 to 20 weight percent of the second monomer of Formula (VII) based on a total weight of monomers in the monomer composition. For example, the monomer composition can contain 85 to 99 weight percent of the first monomer and 1 to 15 weight percent of the second monomer, 90 to 99 weight percent of the first monomer and 1 to 10 weight percent of the second monomer, and 95 to 99 weight percent of the first monomer and 1 to 5 weight percent of the second monomer based on a total weight of monomers in the monomer composition.

In other embodiments, the monomer composition includes a first monomer of Formula (II) and two second monomers. The two second monomers are a sulfonic acid-containing monomer, such as those of Formula (VII), and a hydroxyl-containing monomer, such as those of Formula (V) or (VI). When the hydroxyl-containing monomer is combined with a sulfonic acid-containing monomer, higher amounts of the hydroxyl-containing monomer can be added to the monomer composition without substantially decreasing the porosity of the resulting polymeric particles. That is, the amount of the hydroxyl-containing monomer can be greater than 2 weight percent based on the weight of the monomers in the monomer composition. The monomer composition often contains 80 to 99 weight percent of the first monomer of Formula (II) and 1 to 20 weight percent of the second monomer, wherein the second monomer is a mixture of the sulfonic acid-containing monomer and the hydroxyl-containing monomer. Up to 50 weight percent, up to 40 weight percent, up to 20 weight percent, or up to 10 weight percent of the second monomer can be the hydroxyl-containing monomer.

Other second monomers that can impart an ionic (for example, anionic) character to the porous polymeric particles have a carboxylic acid group (—COOH). Examples of such monomers include, but are not limited to, (meth)acrylic acid, maleic acid, and β-carboxyethyl acrylate. If a monomer having a carboxylic acid group is added, this monomer typically is present in an amount no greater than 20 weight percent, no greater than 15 weight percent, no greater than 10 weight percent, or no greater than 5 weight percent based on the total weight of monomers in the monomer composition. For example, the monomer composition often contains 80 to 99 weight percent of the first monomer of Formula (II) and 1 to 20 weight percent of the second monomer having a carboxylic acid group. For example, the monomer composition can contain 85 to 99 weight percent of the first monomer and 1 to 15 weight percent of the second monomer, 90 to 99 weight percent of the first monomer and 1 to 10 weight percent of the second monomer, and 95 to 99 weight percent of the first monomer and 1 to 5 weight percent of the second monomer based on a total weight of monomers in the monomer composition.

Still other hydrophilic monomers are those of Formula (VIII)

$$CH_2=CR^1—(CO)—O—R^7—N(R^8)_3^+X^- \quad (VIII)$$

having a quaternary ammonium group. The group $R^7$ is an alkylene having 1 to 10 carbon atoms, 1 to 6 carbon atoms, or 1 to 4 carbon atoms. The group $R^8$ is an alkyl having 1 to 4 carbon atoms or 1 to 3 carbon atoms. The anion $X^-$ can be any anion but is often a halide such as chloride. Alternatively the anion can be a sulfate and be associated with two ammonium-containing cationic monomers.

Examples include, but are not limited to, (meth)acrylamidoalkyltrimethylammonium salts (for example, 3-methacrylamidopropyltrimethylammonium chloride and 3-acrylamidopropyltrimethylammonium chloride) and (meth)acryloxyalkyltrimethylammonium salts (for example, 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate). Depending on the pH conditions, these third monomers can impart an ionic (for example, cationic) character to the porous polymeric particles.

If a second monomer of Formula (VIII) is added, this monomer typically is present in an amount no greater than 20 weight percent, no greater than 15 weight percent, no greater than 10 weight percent, or no greater than 5 weight percent based on the total weight of monomers in the monomer composition. For example, the monomer composition often contains 80 to 99 weight percent of the first monomer of Formula (II) and 1 to 20 weight percent of the second monomer of Formula (VIII). For example, the monomer composition can contain 85 to 99 weight percent of the first monomer and 1 to 15 weight percent of the second monomer, 90 to 99 weight percent of the first monomer and 1 to 10 weight percent of the second monomer, and 95 to 99 weight percent of the first monomer and 1 to 5 weight percent of the second monomer based on a total weight of monomers in the monomer composition.

Often if an ionic monomer is added such as one having a carboxylic acid group or a salt thereof, a sulfonic acid group or a salt thereof (such as of Formula (VII)), or an ammonia group (such as of Formula (VIII)), the ionic monomer is often present in low amounts such as in a range of 1 to 10 weight percent, in a range of 1 to 5 weight percent, or in a range of 1 to 3 percent based on the total weight of monomers in the monomer composition. Particularly when the preparation of porous polymeric particles having an average diameter less than about 10 micrometers, less than about 5 micrometers, less than about 4 micrometers, or less than about 3 micrometers are desired, lower concentrations of the ionic monomers in the monomer composition may be preferred. For use with hydrophobic materials or nonionic materials, it may be preferable to have monomer compositions that are free or substantially free of ionic monomers. As used herein in reference to the amount of ionic monomers, "substantially free" means that no such monomer is intentionally added or is added at an amount no greater than 1 weight percent, no greater than 0.5 weight percent, no greater than 0.2 weight percent, or no greater than 0.1 weight percent based on the total weight of monomers in the monomer composition.

In some embodiments, it is preferable that the monomer composition contains only a monomer of Formula (II) or a mixture of a first monomer of Formula (II) and a second monomer of Formula (III) added to increase the hydrophobicity of the porous polymeric particles. For example, some monomer compositions often contains 10 to 90 weight percent of the first monomer and 10 to 90 weight percent of the second monomer based on a total weight of monomers in the monomer composition. For example, the monomer composition can contain 20 to 80 weight percent of the first monomer and 20 to 80 weight percent of the second monomer, 25 to 75 weight percent of the first monomer and 25 to 75 weight percent of the second monomer, 30 to 70 weight percent of the first monomer and 30 to 70 weight percent of the second monomer, or 40 to 60 weight percent of the first monomer and 40 to 60 weight percent of the second monomer.

The monomer composition can optionally contain a third monomer with at least two polymerizable groups. The polymerizable groups are typically (meth)acryloyl groups. In many embodiments, the third monomer has two or three (meth)acryloyl groups. The third monomer typically is not miscible with the first phase and may or may not be miscible with the first monomer of Formula (II).

Some third monomers have a hydroxyl group. Such monomers can function as crosslinkers like the first monomer of Formula (II) but can provide polymeric particles with increased hydrophilic character. An example hydroxyl-containing third monomer is glycerol di(meth)acrylate.

Some third monomers are selected to have at least three polymerizable groups. Such third monomers can be added to provide more rigidity to the resulting polymeric particles. The addition of these third monomers tends to minimize swelling of the polymeric particles when exposed to water. Suitable third monomers include, but are not limited to, ethoxylated trimethylolpropane tri(meth)acrylates such as ethoxylated (15) trimethylolpropane triacrylate (commercially available under the trade designation SR9035 from Sartomer) and ethoxylated (20) trimethylolpropane triacrylate (commercially available under the trade designation SR415 from Sartomer); propoxylated trimethylolpropane tri(meth)acrylates such as propoxylated (3) trimethylolpropane triacrylate (commercially available under the trade designation SR492 from Sartomer) and propoxylated (6) trimethylolpropane triacrylate (commercially available under the trade designation CD501 from Sartomer); tris(2-hydroxyethyl) isocyanurate tri(meth)acrylates such as tris (2-hydroxyethyl) isocyanurate triacrylate (commercially available under the trade designations SR368 and SR368D from Sartomer); and propoxylated glyceryl tri(meth)acrylates such as propoxylated (3) glycerol triacrylate (commercially available under the trade designation SR9020 and SR9020HP from Sartomer).

When a third monomer is present in the monomer composition, any suitable amount can be used. The third monomer is often used in an amount up to 20 weight percent based on the total weight of monomers in the monomer composition. In some embodiments, the amount of the third monomer is up to 15 weight percent, up to 10 weight percent, or up to 5 weight percent.

In some embodiments, the monomer composition contains at least 10 weight percent, at least 20 weight percent, at least 30 weight percent, at least 35 weight percent, at least 40 weight percent, at last 45 weight percent, at least 50 weight percent, at least 55 weight percent, at least 60 weight percent, at least 65 weight percent, at least 70 weight percent, at least 75 weight percent at least 80 weight percent, at least 90 weight percent, or at least 95 weight percent of the first monomer of Formula (II). The remaining amount of the monomer composition can include any combination of the second and third monomers described above. In some embodiments, any remaining amount is a monomer of Formula (III).

The monomer composition often contains 10 to 100 weight percent of the first monomer, 0 to 90 weight percent of the second monomer, and 0 to 20 weight percent of the third monomer based on a total weight of monomers in the monomer composition. For example, the monomer composition can contain 10 to 90 weight percent of the first monomer, 10 to 90 weight percent of the second monomer, and 0 to 20 weight percent of the third monomer. The monomer composition can contain 10 to 89 weight percent of the first monomer, 10 to 89 weight percent of the second monomer, and 1 to 20 weight percent of the third monomer based on a total weight of the monomer composition.

In most embodiments, the porous polymeric particles that are prepared using a second monomer or third monomer that is hydrophilic are particularly suitable to absorb/adsorb moisture.

In addition to the monomer composition, the second phase contains poly(propylene glycol), which functions as a porogen. The poly(propylene glycol) is soluble in the monomer composition within the second phase but is dispersible within the first phase. Stated differently, the poly(propylene glycol) is completely miscible with the second phase and partially miscible with the first phase. The poly(propylene glycol) is removed after polymerization of the monomer composition to provide pores (for example, void volumes or free volumes) in the polymeric particle. The poly(propylene glycol) does not have any polymerizable groups (i.e., it is not a monomer) and, in general, is not covalently attached to the polymeric particles that forms within the second phase. It is believed that some of the poly(propylene glycol) become entrained within the polymerized product. It is further believed that some of the poly(propylene glycol) is positioned on the interface between the first phase and the second phase as the polymerized product is formed in the second phase. The presence of the poly(propylene glycol) at the surface of the forming polymerized product results in the formation of a polymeric particle having surface porosity. The surface porosity can be seen from electron micrographs of the polymeric particles, such as in FIG. 7. A higher magnification of the polymeric particles of FIG. 7 can be seen in FIG. 8.

The second phase can contain up to 50 weight percent poly(propylene glycol). If higher amounts of the poly(propylene glycol) are used, there may be an insufficient amount of the monomer composition included in the second phase to form polymeric particles that are uniformly shaped. In many embodiments, the second phase can contain up to 45 weight percent, up to 40 weight percent, up to 35 weight percent, up to 30 weight percent, or up to 25 weight percent poly (propylene glycol) based on a total weight of the second phase. The second phase typically contains at least 5 weight percent poly(propylene glycol). If lower amounts of the poly(propylene glycol) are used, the porosity of the resulting polymeric particles may be insufficient. The second phase typically can contain at least 10 weight percent, at least 15 weight percent, or at least 20 weight percent poly(propylene glycol). In some embodiments, the second phase contains 5 to 50 weight percent, 10 to 50 weight percent, 10 to 40 weight percent, 10 to 30 weight percent, 20 to 50 weight percent, 20 to 40 weight percent, or 25 to 35 weight percent poly(propylene glycol) based on the total weight of the second phase.

In some embodiments, the second phase contains 50 to 90 weight percent monomer composition and 10 to 50 weight percent poly(propylene glycol), 60 to 90 weight percent monomer composition and 10 to 40 weight percent poly (propylene glycol), 50 to 80 weight percent monomer composition and 20 to 50 weight percent poly(propylene glycol), or 60 to 80 weight percent monomer composition and 20 to 40 weight percent poly(propylene glycol) based on a total weight of the second phase.

In addition to the monomer composition and poly(propylene glycol), the second phase often contains an initiator for free radical polymerization of the monomer composition. Any suitable initiator known in the art can be used. The initiator can be a thermal initiator, a photoinitiator, or both. The specific initiator used is often selected based on its solubility in the second phase. The initiator is often used at a concentration of 0.1 to 5 weight percent, 0.1 to 3 weight percent, 0.1 to 2 weight percent, or 0.1 to 1 weight percent based on the weight of monomers in the monomer composition.

When a thermal initiator is added to the reaction mixture, polymeric particles can be formed at room temperature (i.e., 20 to 25 degrees Celsius) or at an elevated temperature. The temperature needed for polymerization often depends on the particular thermal initiator used. Examples of thermal initiators include organic peroxides and azo compounds.

When a photoinitiator is added to the reaction mixture, polymeric particles can be formed by the application of actinic radiation. Suitable actinic radiation includes electromagnetic radiation in the infrared region, visible region, ultraviolet region, or a combination thereof.

Examples of photoinitiators suitable in the ultraviolet region include, but are not limited to, benzoin, benzoin alkyl ethers (for example, benzoin methyl ether and substituted benzoin alkyl ethers such anisoin methyl ether), phenones (for example, substituted acetophenones such as 2,2-dimethoxy-2-phenylacetophenone and substituted alpha-ketols such as 2-methyl-2-hydroxypropiophenone), phosphine oxides, polymeric photoinitiators, and the like.

Commercially available photoinitiators include, but are not limited to, 2-hydroxy-2-methyl-1-phenyl-propane-1-one (for example, commercially available under the trade designation DAROCUR 1173 from Ciba Specialty Chemicals), a mixture of 2,4,6-trimethylbenzoyl-diphenyl-phosphine oxide and 2-hydroxy-2-methyl-1-phenyl-propan-1-one (for example, commercially available under the trade designation DAROCUR 4265 from Ciba Specialty Chemicals), 2,2-dimethoxy-1,2-diphenylethan-1-one (for example, commercially available under the trade designation IRGACURE 651 from Ciba Specialty Chemicals), a mixture of bis(2,6-dimethoxybenzoyl)-2,4,4-trimethyl-pentylphosphine oxide and 1-hydroxy-cyclohexyl-phenyl-ketone (for example, commercially available under the trade designation IRGACURE 1800 from Ciba Specialty Chemicals), a mixture of bis(2,6-dimethoxybenzoyl)-2,4,4-trimethyl-pentylphosphine oxide (for example, commercially available under the trade designation IRGACURE 1700 from Ciba Specialty Chemicals), 2-methyl-1[4-(methylthio)phenyl]-2-morpholinopropan-1-one (for example, commercially available under the trade designation IRGACURE 907 from Ciba Specialty Chemicals), 1-hydroxy-cyclohexyl-phenyl-ketone (for example, commercially available under the trade designation IRGACURE 184 from Ciba Specialty Chemicals), 2-benzyl-2-(dimethylamino)-1-[4-(4-morpholinyl)phenyl]-1-butanone (for example, commercially available under the trade designation IRGACURE 369 from Ciba Specialty Chemicals), bis(2,4,6-trimethylbenzoyl)-phenylphosphine oxide (for example, commercially available under the trade designation IRGACURE 819 from Ciba Specialty Chemicals), ethyl 2,4,6-trimethylbenzoyldiphenyl phosphinate (for example, commercially available from BASF, Charlotte, NC under the trade designation LUCIRIN TPO-L), and 2,4,6-trimethylbenzoyldiphenylphosphine oxide (for example, commercially available from BASF, Charlotte, NC under the trade designation LUCIRIN TPO).

The reaction mixture often includes at least 5 weight percent of the second phase (dispersed phase) and up to 95 weight percent of the first phase (continuous phase). In some embodiments, the reaction mixture contains 5 to 40 weight percent second phase and 60 to 95 weight percent first phase, 5 to 30 weight percent second phase and 70 to 95 weight percent first phase, 10 to 30 weight percent second phase and 70 to 90 weight percent first phase, or 5 to 20 weight percent second phase and 80 to 95 weight percent first phase. The weight percentages are based on a total weight of the reaction mixture.

To prepare the polymeric particles or beads, droplets of the second phase are formed in the first phase. The components of the second phase are often mixed together prior to addition to the first phase. For example, the monomer composition, initiator, and the poly(propylene glycol) can be blended together and then this blended composition, which is the second phase, can be added to the first phase. The resulting reaction mixture is often mixed under high shear to form a micro-emulsion. The size of the dispersed second phase droplets can be controlled by the amount of shear or the mixing rate. The size of the droplets can be determined by placing a sample of the mixture under an optical microscope prior to polymerization. Although any desired droplet size can be used, the average droplet diameter is often less than 500 micrometers, less than 200 micrometers, less than 100 micrometers, less than 50 micrometers, less than 25 micrometers, less than 10 micrometers, or less than 5 micrometers. For example, the average droplet diameter can be in the range of 1 to 500 micrometers, 1 to 200 micrometers, 1 to 100 micrometers, 5 to 100 micrometers, 5 to 50 micrometers, 5 to 25 micrometers, or 5 to 10 micrometers. If a photoinitiator is used, the reaction mixture is often spread on a non-reactive surface at a thickness that can be penetrated by the desired actinic radiation. The reaction mixture is spread using methods that do not cause the droplets to coalesce. For example, the reaction mixture can be formed using an extrusion method. Often, the actinic radiation is in the ultraviolet region of the electromagnetic spectrum. If the ultraviolet radiation is applied from only the top surface of the reaction mixture layer, the thickness of the layer can be up to about 10 millimeters. If the reaction mixture layer is exposed to ultraviolet radiation from both the top and bottom surfaces, the thickness can be greater such as up to about 20 millimeters. The reaction mixture is subjected to the actinic radiation for a time sufficient to react the monomer composition and form polymeric particles. The reaction mixture layer is often polymerized within 5 minutes, within 10 minutes, within 20 minutes, within 30 minutes, within 45 minutes, or within 1 hour depending on the intensity of the actinic radiation source and the thickness of the reaction mixture layer.

If a thermal initiator is used, the droplets can be polymerized while continuing to mix the reaction mixture. Alternatively, the reaction mixture can be spread on a non-reactive surface to any desired thickness. The reaction mixture layer can be heated from the top surface, from the bottom surface, or both to form the polymeric particles. The thickness is often selected to be comparable to that use with the use of actinic radiation such as ultraviolet radiation.

In many embodiments, a photoinitiator is preferred over a thermal initiator because lower temperatures can be used for polymerization. That is, the use of actinic radiation such as ultraviolet radiation can be used to minimize degradation of various components of the reaction mixture that might be sensitive to temperatures needed for use with thermal initiators. Further, the temperatures typically associated with the use of thermal initiators may undesirably alter the solubility of the various components of the reaction mixture between the first phase and the dispersed second phase.

During the polymerization reaction, the monomer composition reacts within the second phase droplets suspended in the first phase. As polymerization progresses, the poly (propylene glycol) included in the second phase gets partially entrained within the polymerized product. Although it is possible that some portion of the poly(propylene glycol) can be covalently attached to the polymeric product through a chain transfer reaction, preferably the poly(propylene glycol) is not bonded to the polymeric product. The polymerized product is in the form of particles. In some embodiments, the particles are polymeric beads having a relatively uniform size and shape.

After formation of the polymerized product (i.e., polymeric particles containing entrained poly(propylene glycol)), the polymerized product can be separated from the first phase. Any suitable separation method can be used. For example, water is often added to lower the viscosity of the first phase. Particles of the polymerized product can be separated from the other components by decantation, filtration, or centrifugation. The particles of the polymerized product can be further washed by suspending them in water and collecting them a second time by decantation, filtration, or centrifugation.

The particles of the polymerized product can then be subjected to one or more washing steps to remove the poly(propylene glycol) porogen. Suitable solvents for removing the poly(propylene glycol) include, for example, acetone, methyl ethyl ketone, toluene, and alcohols such as ethanol, n-propanol, or iso-propanol. Stated differently, the entrained poly(propylene glycol) is removed from the polymerized product using solvent extraction methods. Pores are created where the poly(propylene glycol) previously resided.

In many embodiments, the resulting porous polymeric particles (the polymerized product after removal of the poly(propylene glycol) porogen) have an average diameter that is less than 500 micrometers, less than 200 micrometers, less than 100 micrometers, less than 50 micrometers, less than 25 micrometers, less than 10 micrometers, or less than 5 micrometers. For example, the porous polymeric particles can have an average diameter in the range of 1 to 500 micrometers, 1 to 200 micrometers, 1 to 100 micrometers, 1 to 50 micrometers, 1 to 25 micrometers, 1 to 10 micrometers, or 1 to 5 micrometers. The particles are often in the form of beads.

The polymeric particles usually have multiple pores distributed over the surface of the particles. In some embodiments, the polymeric particles are hollow in addition to having multiple pores distributed over the surface of the particles. After removal of the poly(propylene glycol) porogen, the resulting polymeric particles tend to be more porous than polymeric particles prepared using a first phase that is predominately water.

The composition of the first aspect includes porous polymeric particles disposed in a coating. As noted above, a coating means a material that is capable of adhering to a material surface, such as a substrate surface. A coating can be applied to a surface as a solution, emulsion, multilayer structure (e.g., adhesive with a backing layer), or as a solid. Exemplary coatings include for instance and without limitation, epoxies, acrylics, urethanes, silicones, and rubbers. In certain embodiments, the coating comprises an adhesive.

Figure 2:
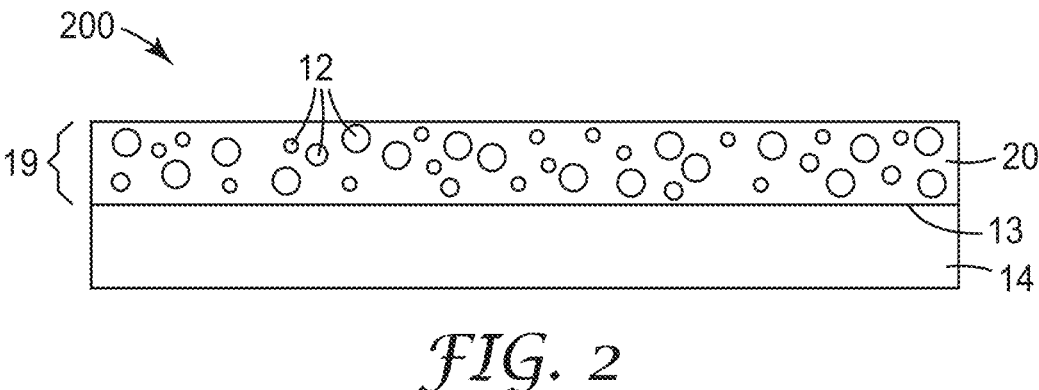
FIG. 2 is a schematic of an exemplary adhesive article according to the disclosure.

In a second aspect, an adhesive article is provided. The adhesive article includes a substrate and a composition disposed on a first major surface of the substrate. Referring to FIG. 2, a cross-sectional schematic of an adhesive article 200 is shown, in which a composition 19 includes a plurality of porous polymeric particles 12 disposed in an adhesive 20, and the composition 19 is disposed on a first major surface 13 of a substrate 14. The porous polymeric particles are according to the first aspect discussed in detail above. Exemplary adhesives include for instance and without limitation, epoxies, acrylics, urethanes, silicones, and rubbers. In certain embodiments, the adhesive comprises a hot melt adhesive, a pressure sensitive adhesive, or a combination thereof. In many embodiments, the substrate comprises a tape backing, such as a polymeric film, a paper, a nonwoven matrix, a woven matrix, a conductive sheet, or a foam.

Figure 3:
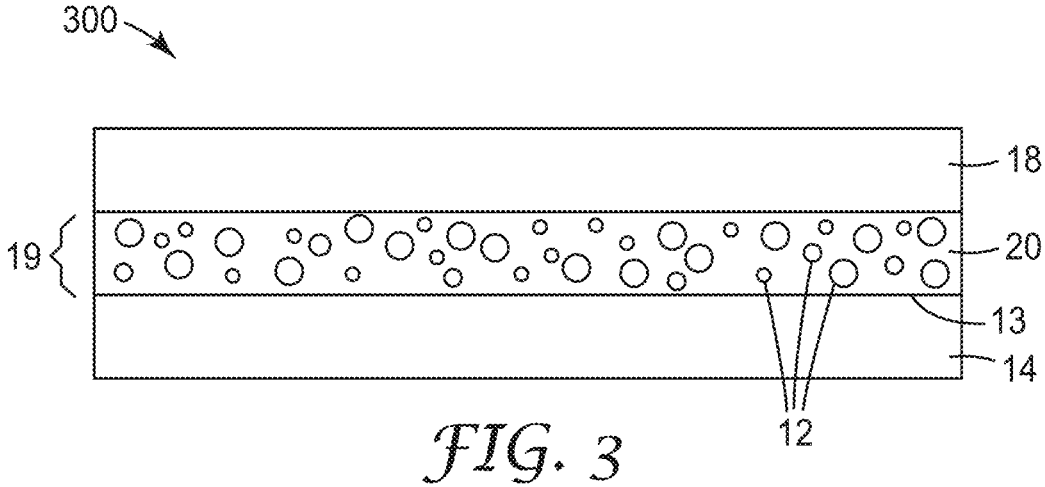
FIG. 3 is a schematic of another exemplary adhesive article according to the disclosure.

The adhesive article optionally further includes a release liner disposed on the composition. Referring to FIG. 3, a cross-sectional schematic of an adhesive article 300 is shown, in which a composition 19 includes a plurality of porous polymeric particles 12 disposed in an adhesive 20, and the composition 19 is disposed on a first major surface 13 of a substrate 14. A release liner 18 is disposed on the composition 19 opposite the substrate 14. The release liner is formed from, or coated with, a material that releases cleanly from the adhesive when peeled off by the end user, in embodiments transferring substantially no residue of the release liner material on or in the adhesive. Such release liners are well known by those of skill and any of the conventionally employed release liners are suitably applied to the adhesive, for example silicone-coated paper.

Figure 4:
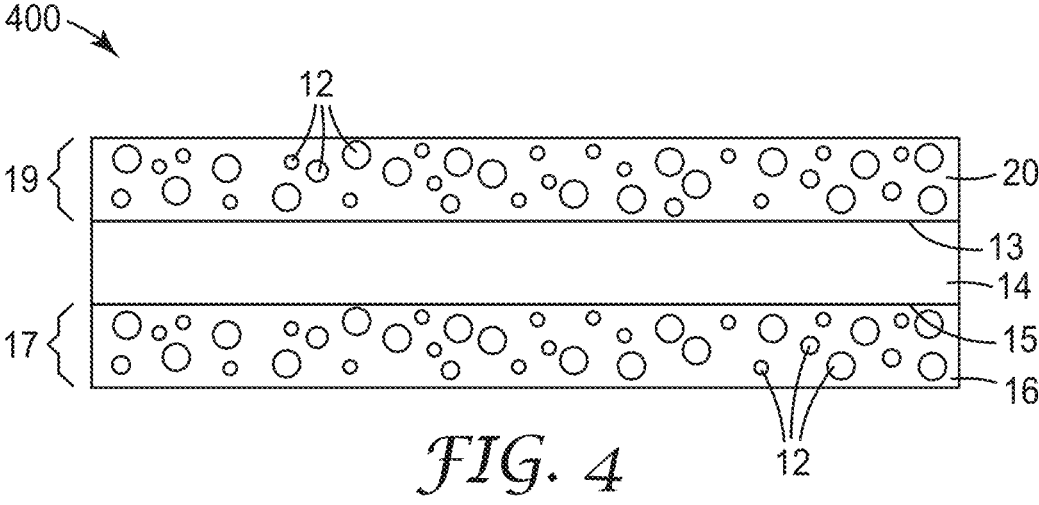
FIG. 4 is a schematic of a further exemplary adhesive article according to the disclosure.

The adhesive article optionally also includes a second composition disposed on a second major surface of the substrate. Referring to FIG. 4, a cross-sectional schematic of an adhesive article 400 is shown, in which a composition 19 includes a plurality of porous polymeric particles 12 disposed in an adhesive 20, and the composition 19 is disposed on a first major surface 13 of a substrate 14. A second composition 17 is disposed on a second major surface 15 of the substrate 14. The second composition 17 includes a plurality of porous polymeric particles 12 disposed in an adhesive 16, which may be the same as or different from the adhesive 20. In an alternate embodiment, the second composition includes an adhesive 16 but is free of porous polymeric particles (not shown). Optionally, the adhesive article further comprises one or more release liners disposed on the first composition, the second composition, or both, opposite the substrate (not shown). Adhesive articles according to such embodiments can be useful for adhering two materials together, for instance adhering a non-adhesive material to a structural component.

Advantageously, the porous polymeric particles can absorb and transport fluids. Without wishing to be bound by theory, it is believed that the porous polymeric particles draw moisture from the composition/substrate interface when the substrate has moisture deposited on its surface, resulting in improved adhesion of the coating as compared to the same coating without the porous polymeric particles. The moisture typically includes condensation (e.g., dew) and/or a standing fluid (e.g., rain water) present on one or more areas of the substrate surface. Because the polymeric particles tend to be highly crosslinked, they tend to swell little even when moisture is absorbed. That is, the polymeric particles undergo a relatively small change in volume when moisture is absorbed. Without wishing to be bound by theory, it believed that the spherical shape and tortuosity of surface of the porous polymeric particles result in a structure that not only breaks the surface tension of many fluids but also results in an increased capillary action that facilitates the transport of fluids throughout the composition. The combined effect of the action of the morphology of the particles and their placement in the composition results in transporting moisture away from the interface of a wet substrate and the composition.

In most embodiments, the porous polymeric particles are free of a coating applied to an exterior surface of the porous polymeric particles to ensure that the porous surface is accessible to moisture. In most embodiments, the porous polymeric particles are free of an active loaded into the porous polymeric particles, which makes the full volume of the porous polymeric particles available for moisture, and also limits the introduction of active materials into the coating.

As discussed above, the porous polymeric particles can be made to have hydrophilic character, hydrophobic character, or both. Accordingly, in any embodiment, the porous polymeric particles in a coating comprise hydrophilic particles, hydrophobic particles, or a combination of hydrophilic particles and hydrophobic particles. In certain embodiments, the porous polymeric particles comprise a unimodal particle size distribution, while in other embodiments the porous polymeric particles comprise a multimodal particle size distribution, such as a bimodal particle size distribution.

The amount of porous polymeric particles included in compositions according to the disclosure (e.g., porous polymeric particles disposed in a coating or adhesive) is typically at least 1 percent by weight porous polymeric particles, or at least 2 percent by weight, or at least 3 percent by weight, or at least 4 percent by weight, or at least 5 percent by weight, or at least 6 percent by weight, or at least 8 percent by weight porous polymeric particles based on a total weight of the composition. The amount of porous polymeric particles included in compositions according to the disclosure is optionally up to 15 percent by weight porous polymeric particles, or up to 14 percent by weight, or up to 13 percent by weight, or up to 12 percent by weight, or up to 10 percent by weight, or up to 9 percent by weight, or up to 7 percent by weight, or up to 5 percent by weight porous polymeric particles based on a total weight of the composition. Stated differently, the composition often contains between 1 percent by weight and 15 percent by weight, or between 2 percent by weight and 10 percent by weight, or between 1 percent by weight and 4 percent by weight, or between 5 percent by weight and 10 percent by weight, or between 5 percent by weight and 15 percent by weight porous polymeric particles based on a total weight of the composition. The lower practical limit of porous polymeric particles in the composition can be determined by providing measurable improved adhesion to a substrate surface having moisture present on the surface. The upper practical limit of porous polymeric particles in the composition can be determined by their effect on adhesion between the specific composition and a substrate on which the composition will be coated. In most embodiments, the thickness of the compositions according to the disclosure is greater than the average diameter of the porous polymeric particles, and is preferably greater than the diameter of the largest porous polymeric particles.

Figure 5:
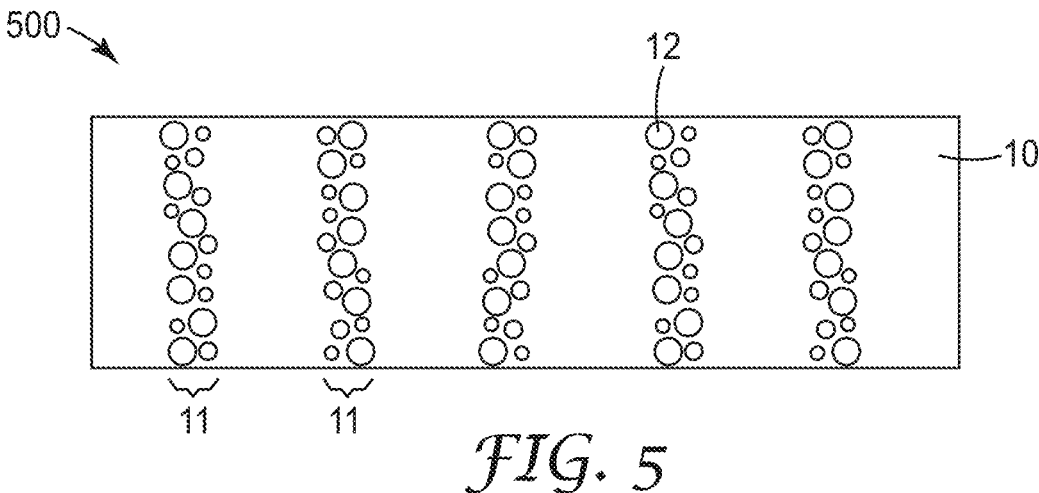
FIG. 5 is a top view schematic of an exemplary coating having porous polymeric particles disposed in a pattern according to the disclosure.

Referring to FIG. 5, a top view schematic of a composition 500 is shown, in which a plurality of porous polymeric particles 12 are disposed in the coating 10 in a pattern. The pattern of the exemplary embodiment of FIG. 5 includes a series of lines 11 of porous polymeric particles disposed along the length of the coating 10, in which each line 11 is substantially perpendicular to the length of the coating 10. Any contemplated pattern may be employed such that there are areas of the coating containing the porous polymeric particles and areas of the coating that are free of the porous polymeric particles. Advantages of distributing the porous polymeric particles in a particular pattern includes providing portions of a coating that has areas of highest adhesion to a substrate (i.e., areas in which no particles are included) as well as areas of higher moisture absorption but potentially lower adhesion to a substrate (i.e., areas in which particles are included).

As noted above, the coating or adhesive optionally comprises an epoxy, an acrylic, a urethane, a silicone, a rubber, or a combination thereof. Suitable epoxy resins include those formed from monomers having at least two 1,2-cyclic ethers. Such compounds can be saturated or unsaturated, aliphatic, aromatic or heterocyclic, or can include combinations thereof. Suitable epoxies may be solid or liquid at room temperature. It is also within the scope of this disclosure to use a material with functionality in addition to epoxide functionality but which is essentially unreactive with the epoxide functionality, for example, a material containing both epoxide and acrylic functionality. An optional additive is a core-shell toughener. Examples of suitable epoxide-based adhesives that are commercially available include those available from 3M Company, St. Paul, MN under the trade designations "3M SCOTCH-WELD EPDXY ADHESIVE" and "3M SCOTCHKOTE 328".

Suitable epoxy resin compositions may be made from thermally curable epoxy resins. The term epoxy resin composition will typically be used to refer to an uncured composition. An exemplary epoxy resin composition includes one or more aromatic polyepoxides and one or more 9,9-bis(aminophenyl)fluorene curing agents. Suitable aromatic polyepoxides include poly(glycidyl ether)s of polyhydric phenols and epoxy resins available from Shell Chemical Company, Houston, Tex., under the trade designations EPON 1001F and EPON 1050. Other suitable resins include blends of a diglycidylether of bisphenol A and a novolac epoxy, for example, 75 to 90% by weight EPON 1001F and 25 to 10% by weight EPON 1050F based on the total weight of the resin. Suitable curing agents for the epoxy resin compositions include, but are not limited to, di(4-aminophenyl)sulfone and 9,9-bis(aminophenyl)fluorene as described in U.S. Pat. No. 4,684,678.

Suitable urethane resins include polymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)). Urethane adhesives can include two-part room temperature-curing adhesives. Urethane adhesives can also include one-part moisture curing adhesives that are applied when warm including those available from 3M Company, St. Paul, MN under the trade designation "3M SCOTCH-WELD POLYURETHANE REACTIVE ADHESIVES".

Suitable free radically-curing acrylics can include, but are not limited to, those formed from methyl methacrylate, methacrylic acid, tetrahydrofurfuryl methacrylate, isobornyl acrylate, and isobornyl methacrylate. Multifunctional (meth) acrylic acid esters can optionally be included as crosslinking agents. These multifunctional (meth)acrylates can include, but are not limited to, ethylene glycol dimethacrylate, 1,6-hexanediol dimethacrylate, 1,6-hexanediol diacrylate, trimethylolpropane triacrylate, pentaerythritol tetraacrylate, 1,2-ethylene glycol diacrylate, the dimethacrylate of ethylene oxide modified bisphenol A and the diacrylate of ethylene oxide modified bisphenol A. Suitable acrylic adhesives include free radically-curing acrylics and cyanoacrylates. The term "(meth)acrylic" as used herein refers to acrylic and methacrylic. The acrylic adhesives can include conventional additives such as plasticizers, tougheners, flow modifiers, neutralizing agents, stabilizers, antioxidants, fillers, colorants, and the like.

The (meth)acrylic adhesives can be cured through free radical initiated polymerization. In one type of polymerization, the free radicals are generated by a redox reaction. Redox initiators can include peroxides, hydroperoxides, metal ions, saccharin, and N,N-dimethyl-p-toluidine. The free radicals can be generated in a two-part adhesive system that cures at room temperature after mixing or in a one-part adhesive system. The polymerization of the (meth)acrylic adhesive monomers to form a polymer useful in the present disclosure can be carried out using thermal energy, electron-beam radiation, ultraviolet radiation, and the like. Such polymerizations can be facilitated by a polymerization initiator, which can be a thermal initiator or a photoinitiator. Examples of suitable photoinitiators include, but are not limited to, benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone. A suitable (meth)acrylic adhesive is available from 3M Company, St. Paul, MN, under the trade designation "3M FAST-BOND 49".

Suitable silicone resins include moisture-cured silicones, condensation-cured silicones, and addition-cured silicones, such as hydroxyl-terminated silicones, silicone rubber, and fluoro-silicone. Examples of suitable commercially available silicone pressure-sensitive adhesive compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. An example of a two-part silicone resin is commercially available under the trade designation "SILASTIC J" from Dow Chemical Company, Midland, MI.

Hot melt adhesives can include natural or synthetic rubbers, butyl rubber, nitrile rubbers, synthetic polyisoprene, ethylene-propylene rubber, ethylene-propylene-diene monomer rubber (EPDM), polybutadiene, polyisobutylene, poly (alpha-olefin), styrene-butadiene random copolymer, fluoroelastomers, silicone elastomers, and combinations thereof.

Figure 6:
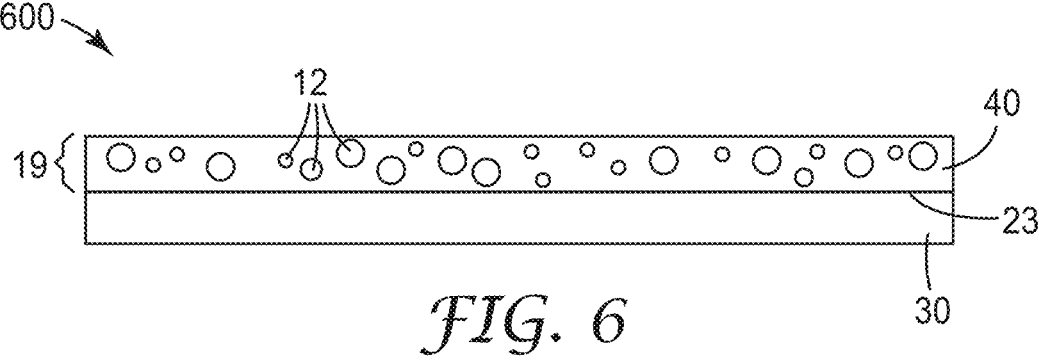
FIG. 6 is a schematic of an exemplary coating on a substrate according to the disclosure.

In a third aspect, a method of coating a substrate is provided. The method includes providing a composition; providing a substrate having a surface; and applying the composition on the surface of the substrate. The composition includes a coating and porous polymeric particles according to the first aspect disposed in the coating. Referring to FIG. 6, a cross-sectional schematic of a coated substrate 600 is shown, in which a composition 19 includes a plurality of porous polymeric particles 12 disposed in a coating 40, and the composition 19 is disposed on a first major surface 23 of a substrate 30. Advantageously, it is not necessary to wait for a substrate surface to be free of moisture to apply the composition on the surface of the substrate. For instance, the method optionally includes applying the composition to the substrate surface when an ambient air temperature is less than 5 degrees Fahrenheit (about 2.8 degrees Celsius) above an ambient air dew point at the time of coating the composition on the surface of the substrate. Preferably, the ambient air temperature is at least 32 degrees Fahrenheit (0 degrees Celsius) at the time of coating the composition on the surface of the substrate. Water condensation may be disposed on at least a portion of the surface of the substrate at the time of coating the composition on the surface of the substrate. Moreover, standing water may be disposed on at least a portion of the substrate of the substrate at the time of coating the composition on the surface of the substrate. It is preferred, however, that the composition not be coated on the surface of the substrate at a time when water is flowing on or off of the substrate surface. As noted above, typically a maximum amount of moisture is about 2 milliliters of moisture per 103 square centimeters of substrate surface area. Above this amount, moisture tends to run off of the surface.

Typically, the composition is coated on the surface of the substrate at a thickness of at least the average diameter of the particles. Exemplary substrates include for instance and without limitation, metal, plastic, glass, concrete, and wood. In certain embodiments, the substrate is steel. Applying the composition on the surface of the substrate optionally comprises coating the composition on the surface of the substrate, in which the application method may involve forming a coating by spray coating, wiping, roll coating, brushing, spreading, flow coating, dip coating, bar coating, spin coating, vapor deposition, slot coating, slide coating, or the like, or combinations thereof. For coating compositions that are self-supporting, applying the composition on the surface of the substrate often comprises contacting the composition with the surface of the substrate and optionally heating the composition. For coating compositions comprising an adhesive article, applying the composition on the surface of the substrate often includes contacting the adhesive article with the surface of the substrate. When the adhesive article comprises a release liner, the method further includes removing the release liner from the adhesive article prior to or simultaneously with contacting the adhesive article with the surface of the substrate.

Various embodiments are provided that include a composition, an adhesive article, and a method of coating a substrate.

Embodiment 1 is a composition including 1) a coating; and 2) porous polymeric particles disposed in the coating. The porous polymeric particles comprise a polymerized product of a reaction mixture including a) a first phase and b) a second phase dispersed in the first phase. The first phase includes i) a compound of Formula (I) and ii) a nonionic surfactant.

$$HO(—CH_2—CH(OH)—CH2\text{-}O)_n—H \qquad (I)$$

In Formula (I), n is an integer equal to at least 1. A volume of the first phase is greater than a volume of the second phase. The second phase includes i) a monomer composition comprising a monomer of Formula (II) and ii) a poly(propylene glycol) having a weight average molecular weight of at least 500 grams/mole. The poly(propylene glycol) is removed from the polymerized product to provide the porous polymeric particles.

$$CH_2\!=\!C(R^1)\!-\!(CO)\!-\!O[-\!CH_2\!-\!CH_2\!-\!O]_p\!-\!$$
$$(CO)\!-\!C(R^1)\!=\!CH_2 \qquad\qquad (II)$$

In Formula (II), p is an integer equal to at least 1 and $R^1$ is a hydrogen or alkyl.

Embodiment 2 is the composition of embodiment 1, wherein the coating includes an adhesive.

Embodiment 3 is the composition of embodiment 1 or embodiment 2, wherein the porous polymeric particles are free of a coating applied to an exterior surface of the porous polymeric particles.

Embodiment 4 is the composition of any of embodiments 1 to 3, wherein the porous polymeric particles are free of an active loaded into the porous polymeric particles.

Embodiment 5 is the composition of any of embodiments 1 to 4, wherein the coating comprises an epoxy, an acrylic, a urethane, a silicone, a rubber, or a combination thereof.

Embodiment 6 is the composition of any of embodiments 1 to 5, wherein the porous polymeric particles comprise hydrophilic particles, hydrophobic particles, or a combination thereof.

Embodiment 7 is the composition of any of embodiments 1 to 6, wherein the porous polymeric particles comprise a combination of hydrophilic particles and hydrophobic particles.

Embodiment 8 is the composition of any of embodiments 1 to 7, wherein the porous polymeric particles have a unimodal particle size distribution.

Embodiment 9 is the composition of any of embodiments 1 to 7, wherein the porous polymeric particles have a bimodal particle size distribution.

Embodiment 10 is the composition of any of embodiments 1 to 9, including at least 1 percent by weight porous polymeric particles.

Embodiment 11 is the composition of any of embodiments 1 to 10, including up to 15 percent by weight porous polymeric particles.

Embodiment 12 is the composition of any of embodiments 1 to 11, including between 2 percent by weight and 10 percent by weight porous polymeric particles.

Embodiment 13 is the composition of any of embodiments 1 to 12, wherein the particles are disposed in the coating in a pattern.

Embodiment 14 is an adhesive article including a substrate and a composition disposed on a first major surface of the substrate. The composition includes 1) an adhesive and 2) porous polymeric particles disposed in the adhesive. The porous polymeric particles comprise a polymerized product of a reaction mixture including a) a first phase and b) a second phase dispersed in the first phase. The first phase includes i) a compound of Formula (I) and ii) a nonionic surfactant.

$$HO(-CH_2\!-\!CH(OH)\!-\!CH2\text{-}O)_n\!-\!H$$

In Formula (I), n is an integer equal to at least 1. A volume of the first phase is greater than a volume of the second phase. The second phase includes i) a monomer composition comprising a monomer of Formula (II) and ii) a poly(propylene glycol) having a weight average molecular weight of at least 500 grams/mole. The poly(propylene glycol) is removed from the polymerized product to provide the porous polymeric particles.

24

$$CH_2\!=\!C(R^1)\!-\!(CO)\!-\!O[-\!CH_2\!-\!CH_2\!-\!O]\!-\!$$
$$(CO)\!-\!C(R^1)\!=\!C\ H_2 \qquad\qquad (II)$$

In Formula (II), p is an integer equal to at least 1 and R' is a hydrogen or alkyl.

Embodiment 15 is the adhesive article of embodiment 14, wherein the substrate includes a tape backing.

Embodiment 16 is the adhesive article of embodiment 15, wherein the tape backing includes a polymeric film, a paper, a nonwoven matrix, a woven matrix, a conductive sheet, or a foam.

Embodiment 17 is the adhesive article of any of embodiments 14 to 16, wherein the particles are disposed in the adhesive in a pattern.

Embodiment 18 is the adhesive article of any of embodiments 14 to 17, further including a release liner disposed on the composition.

Embodiment 19 is the adhesive article of any of embodiments 14 to 18, wherein the adhesive includes a hot melt adhesive.

Embodiment 20 is the adhesive article of any of embodiments 14 to 19, wherein the adhesive includes a pressure sensitive adhesive.

Embodiment 21 is the adhesive article of any of embodiments 14 to 20, wherein the adhesive includes an epoxy, an acrylic, a urethane, a silicone, a rubber, or a combination thereof.

Embodiment 22 is the adhesive article of any of embodiments 14 to 21, wherein the composition has a thickness of at least the average diameter of the particles.

Embodiment 23 is the adhesive article of any of embodiments 14 to 22, further including a second composition disposed on a second major surface of the substrate.

Embodiment 24 is the adhesive article of any of embodiments 14 to 23, wherein the porous polymeric particles are free of a coating applied to an exterior surface of the porous polymeric particles.

Embodiment 25 is the adhesive article of any of embodiments 14 to 24, wherein the porous polymeric particles are free of an active loaded into the porous polymeric particles.

Embodiment 26 is the adhesive article of any of embodiments 14 to 25, wherein the porous polymeric particles include hydrophilic particles and/or hydrophobic particles.

Embodiment 27 is the adhesive article of any of embodiments 14 to 26, wherein the porous polymeric particles include a combination of hydrophilic particles and hydrophobic particles.

Embodiment 28 is the adhesive article of any of embodiments 14 to 27, wherein the porous polymeric particles have a unimodal particle size distribution.

Embodiment 29 is the adhesive article of any of embodiments 14 to 27, wherein the porous polymeric particles have a bimodal particle size distribution.

Embodiment 30 is the adhesive article of any of embodiments 14 to 29, wherein the adhesive includes at least 1 percent by weight porous polymeric particles.

Embodiment 31 is the adhesive article of any of embodiments 14 to 30, wherein the adhesive includes up to 15 percent by weight porous polymeric particles.

Embodiment 32 is the adhesive article of any of embodiments 14 to 31, wherein the adhesive includes between 2 percent by weight and 10 percent by weight porous polymeric particles.

Embodiment 33 is a method of coating a substrate including a) providing a composition, b) providing a substrate comprising a surface, and c) applying the composition on the surface of the substrate. The composition includes 1) a coating and 2) porous polymeric particles disposed in the coating. The porous polymeric particles comprise a polymerized product of a reaction mixture including a) a first phase and b) a second phase dispersed in the first phase. The first phase includes i) a compound of Formula (I) and ii) a nonionic surfactant.

$$HO(-CH_2-CH(OH)-CH_2-O)_n-H \qquad (I)$$

In Formula (I), n is an integer equal to at least 1. A volume of the first phase is greater than a volume of the second phase. The second phase includes i) a monomer composition comprising a monomer of Formula (II) and ii) a poly (propylene glycol) having a weight average molecular weight of at least 500 grams/mole. The poly(propylene glycol) is removed from the polymerized product to provide the porous polymeric particles.

$$CH_2=C(R^1)-(CO)-O[-CH_2-CH_2-O]_p- \\ (CO)-C(R^1)=CH_2 \qquad (II)$$

In Formula (II), p is an integer equal to at least 1 and $R^1$ is a hydrogen or alkyl.

Embodiment 34 is the method of embodiment 33, wherein an ambient air temperature is less than 5 degrees Fahrenheit (about 2.8 degrees Celsius) above an ambient air dew point at the time of coating the composition on the surface of the substrate.

Embodiment 35 is the method of embodiment 33 or embodiment 34, wherein the ambient air temperature is at least 32 degrees Fahrenheit (0 degrees Celsius) at the time of coating the composition on the surface of the substrate.

Embodiment 36 is the method of any of embodiments 33 to 35, wherein water condensation is disposed on at least a portion of the surface of the substrate at the time of coating the composition on the surface of the substrate.

Embodiment 37 is the method of any of embodiments 33 to 36, wherein standing water is disposed on at least a portion of the substrate of the substrate at the time of coating the composition on the surface of the substrate.

Embodiment 38 is the method of any of embodiments 33 to 37, wherein the composition is coated on the surface of the substrate at a thickness of at least the average diameter of the particles.

Embodiment 39 is the method of any of embodiments 33 to 38, wherein the substrate is selected from metal, plastic, glass, concrete, and wood.

Embodiment 40 is the method of any of embodiments 33 to 39, wherein the substrate is steel.

Embodiment 41 is the method of any of embodiments 33 to 40, wherein the applying the composition on the surface of the substrate includes coating the composition on the surface of the substrate.

Embodiment 42 is the method of any of embodiments 33 to 40, wherein the applying the composition on the surface of the substrate includes contacting the composition with the surface of the substrate and optionally heating the composition.

Embodiment 43 is the method of any of embodiments 33 to 40, wherein the composition is part of an adhesive article, and the applying the composition on the surface of the substrate includes contacting the adhesive article with the surface of the substrate.

Embodiment 44 is the method of embodiment 43, wherein the adhesive article includes a release liner and the method further includes removing the release liner from the adhesive article prior to or simultaneously with contacting the adhesive article with the surface of the substrate.

Embodiment 45 is the method of any of embodiments 33 to 44, wherein the porous polymeric particles are free of a coating applied to an exterior surface of the porous polymeric particles.

Embodiment 46 is the method of any of embodiments 33 to 45, wherein the porous polymeric particles are free of an active loaded into the porous polymeric particles.

Embodiment 47 is the method of any of embodiments 33 to 46, wherein the coating includes an epoxy, an acrylic, a urethane, a silicone, a rubber, or a combination thereof.

Embodiment 48 is the method of any of embodiments 33 to 47, wherein the porous polymeric particles include hydrophilic particles, hydrophobic particles, or a combination thereof.

Embodiment 49 is the method of any of embodiments 33 to 48, wherein the porous polymeric particles include a combination of hydrophilic particles and hydrophobic particles.

Embodiment 50 is the method of any of embodiments 33 to 49, wherein the porous polymeric particles have a unimodal particle size distribution.

Embodiment 51 is the method of any of embodiments 33 to 49, wherein the porous polymeric particles have a bimodal particle size distribution.

Embodiment 52 is the method of any of embodiments 33 to 51, wherein the composition includes at least 1 percent by weight porous polymeric particles.

Embodiment 53 is the method of any of embodiments 33 to 52, wherein the composition includes up to 15 percent by weight porous polymeric particles.

Embodiment 54 is the method of any of embodiments 33 to 53, wherein the composition includes between 2 percent by weight and 10 percent by weight porous polymeric particles.

Embodiment 55 is the method of any of embodiments 33 to 54, wherein the particles are disposed in the coating in a pattern.

EXAMPLES

Unless otherwise noted, all chemicals used in the examples can be obtained from Sigma-Aldrich Corp. (Saint Louis, MO). Unless otherwise specified, all chemical supplies and reagents were purchased as standard products from either Sigma-Aldrich or VWR.

TABLE 1

| Materials | |
| --- | --- |
| Designation | Description |
| 3M FASTBOND 49 | Water-based acrylic pressure sensitive adhesive, obtained from 3M Company (St. Paul, MN, USA) |
| 005-MSOL PET | PET film backing primed with 0.5 mils (12.7 micrometers) of a continuous gelled network of inorganic particles containing an ambifunctional silane (prepared according to the disclosure of EP0372756B1 (Strobel et al.) |

TABLE 1-continued

| Materials | |
| --- | --- |
| Designation | Description |
| 3M SCOTCHKOTE 328 | 100% solids, two-part liquid epoxy coating, obtained from 3M Company (St. Paul, MN, USA) |
| APG 325N | Nonionic alkyl polyglucoside surfactant, obtained from Cognis Corporation (Cincinnati, OH, USA) |
| CAPA 2043 | Trade designation for a linear polyester diol terminated by primary hydroxyl groups with a weight average molecular weight of 400 grams/mole, obtained from Perstorp Holding AB (Malmo, Sweden) |
| CAPA 3031 | Trade designation for a trifunctional caprolactone polyol terminated by primary hydroxyl groups with a weight average molecular weight of 300 grams/mole, obtained from Perstorp Holding AB (Malmo, Sweden) |
| DBTDL | Dibutyltin dilurate, obtained from Sigma Aldrich (St. Louis, MO, USA) |
| DESMODUR W | Trade designation for a dicyclohexylmethane diisocyanate, obtained from Bayer MaterialScience AG (Brunsbuettel, Germany) |
| Glycerol | Obtained from Sigma-Aldrich Corp. (Saint Louis, MO, USA) |
| IPA | Isopropyl alcohol, obtained from Sigma Aldrich (St. Louis, MO, USA) |
| IRGACURE 819 | Trade designation for the photoinitiator bis(2,4,6-trimethylbenzoy1)-phenylphosphineooxide, obtained from BASF (Florham Park, NJ, USA) |
| PPG4000 | Polypropylene glycol having a weight average molecular weight of 4000 grams/mole, obtained from Alfa Aesar (Ward Hill, MA, USA) |
| 2-Sulfoethyl Methacrylate | Monomer available from Scientific Polymer, Inc. (Ontario, NY, USA) |
| SR 339 | Trade designation for 2-phenoxyethyl acrylate ester obtained from Sartomer Company, Inc. (Exton, PA, USA) |
| SR 6030 | Trade designation for polyethylene glycol 400 dimethacrylate with a weight average molecular weight of 400 grams/mole obtained from Sartomer Company, Inc. (Exton, PA, USA) |
| TOLONATE HDT-LV | Trade designation for a solvent free low viscosity aliphatic polyisocyanate, obtained from Vencorex US, Inc. (Freeport, TX, USA) |

Preparative Example 1 (PE-1): Synthesis of Nanoporous Microparticles Having Hydrophobic and Hydrophilic Moieties The monomers SR 339, SR 6030P and sulfoethyl methacrylate were mixed with PPG4000 and IRGACURE 819 according to the three formulations in Table 2 below. Each mixture was stirred vigorously for 20 minutes on gentle heat of about 40° C. to 50° C. The mixtures were then added to glycerol previously mixed with the surfactant APG 325 obtained from Cognis Corporation. The mixtures were shear mixed for 20 minutes. The mixtures were each then spread thin between two sheets of polyethylene terephthalate (PET) and cured with ultraviolet light for 10 to 15 minutes with a 100 Watts, long-wavelength BLACK RAY UV lamp (obtained from UVP, LLC of Upland, CA, USA) situated at about 15 centimeters (6 inches) from the surface of the curing material.

Figure 7:
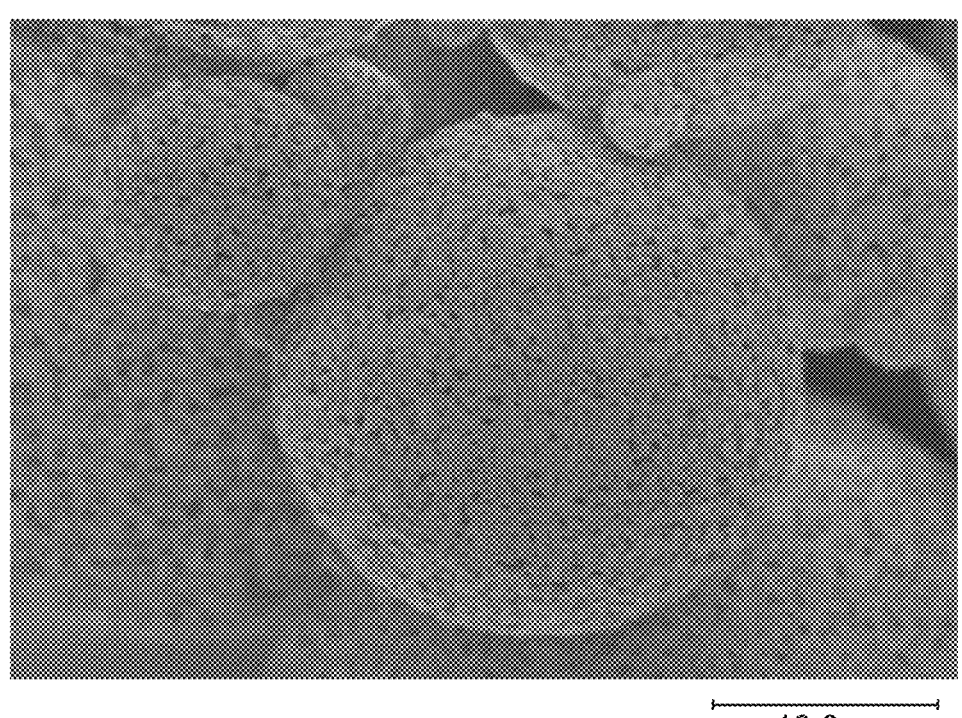
FIG. 7 is the scanning electron micrograph (SEM) of porous polymeric particles prepared as described in Preparatory Example 1.
Figure 8:
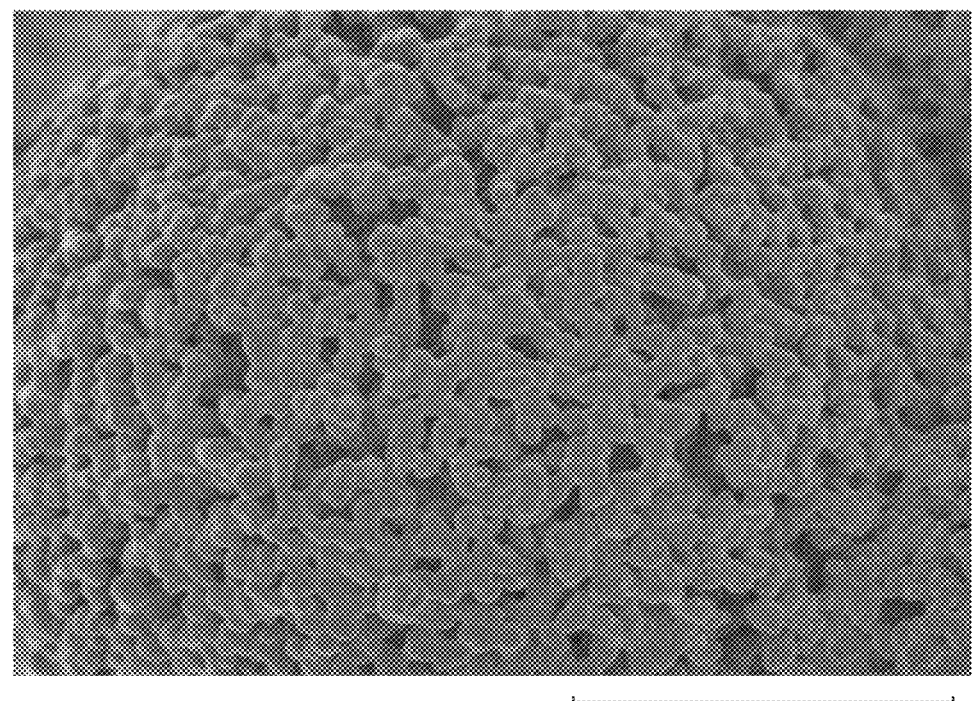
FIG. 8 is the SEM of a porous polymeric particle of FIG. 7 at a higher resolution.

The cured mixtures were then dispersed separately in excess water (500 mL), shaken for 30 minutes, and centrifuged at 3000 rpm in an EPPENDORF 5810 R centrifuge (obtained from Eppendorf in Germany). The supernatant was removed and the resulting particles were then re-suspended in 500 mL of water for a second rinse followed by centrifugation. After this, the particles were suspended in a 500 mL isopropyl alcohol and shaken for 20 minutes. This extracted the PPG and left voids (i.e., pores or free volume) in the particles. The particles were then centrifuged at 300 rpm for 30 minutes and the supernatant was discarded. The particles were oven-dried overnight at 70° C. to eliminate any isopropyl alcohol left in the mixture. FIG. 7 is a digital SEM image of the particles from PE-1. FIG. 8 is a digital SEM image of the particles from PE-1 at a higher magnification.

TABLE 2

| | Particle Formulations | | |
| --- | --- | --- | --- |
| | Particle Type | | |
| Material | Large, 50/50 | Small, 50/50 | Small, All hydrophilic |
| SR339 | 50 g | 50 g | 0 g |
| SR 6030P | 50 g | 50 g | 100 g |
| 2-Sulfoethyl Methacrylate | 5 g | 5 g | 5 g |
| PPG 4000 | 43 g | 43 g | 43 g |
| IRG 819 | 0.25 g | 0.25 g | 0.25 g |
| Glycerol | 300 g | 750 g | 750 g |
| APG 325N | 15 g | 7.5 g | 7.5 g |

Example 2: Improved Adhesion to Wet Surfaces Using Nanoporous Microparticles Additives in Coatings Sample Preparation:

Large, 50/50 hydrophilic/hydrophobic particles having an average particle size of 34±12 micrometers (based on SEM image analysis) from Preparative Example 1 were mixed with 3M SCOTCHKOTE 328 coating (available from 3M Company, St. Paul, MN, USA) at 10% by weight particles. Four inch×four inch (10.16 cm×10.16 cm) steel plates were grit-blasted, and wet evenly by a certain amount of water. The epoxy composites were coated on top of that surface, at a thickness of 0.8 millimeters by cast coating. Control samples of the same coating to non-wet substrates were carried out for comparison. Coatings were allowed to dry at room temperature for two days.

Pull Adhesion Testing:

The adhesion strength of the coatings was measured by mechanical pull-off tests using a POSITEST Adhesion Tester (POSITEST AT-M, obtained from Defelsko Corporation, Ogdensburg, NY, USA). The dolly and the coating were cleaned and abraded. The adhesive was prepared and applied to the dolly. The dolly was then adhered to the coated surface and the adhesive was allowed to cure. After the adhesive was dried completely, the test area of the coating was separated from the area surrounding the dolly by drilling. Next, the pull-off adhesion tester was applied on the test area. The dolly was lassoed and stretched slowly until the testing coating was destroyed and the max pull-off pressure recorded. For consistency, five tests were done for each sample. The results of the pull adhesion test on these coatings in pounds per square inch (psi) and megapascals (MPa) are shown in Table 3 below.

TABLE 3

Pull Adhesion Test Results

| Sample | Amount of water on surface (mL) | Average of pull adhesion (psi) | Standard deviation |
|---|---|---|---|
| SK 328 | 0 | 817 (5.63 MPa) | 63 (0.43 MPa) |
| SK 328 w 10% particle | 0 | 629 (4.34 MPa) | 10 (0.07 MPa) |
| SK 328 | 1 | 101 (0.70 MPa) | 4 (0.03 MPa) |
| SK 328 w 10% particle | 1 | 612 (4.22 MPa) | 17 (0.12 MPa) |
| SK 328 | 2 | 0 | 0 |
| SK 328 w 10% particle | 2 | 131 (0.90 MPa) | 60 (0.41 MPa) |

Example 3: Improved Adhesion to Wet Surfaces Using Nanoporous Microparticles Additives in Pressure Sensitive Adhesive (PSA) Tape Sample Preparation:

Small, 50/50 hydrophilic/hydrophobic particles or small hydrophilic particles having an average particle size of 17±5 micrometers (based on SEM image analysis) from Preparative Example 1 were mixed with 3M water based acrylic PSA 3M FASTBOND 49 (obtained from 3M Company, St. Paul, MN, USA) at 5% by weight. The tape samples were made by coating a 1.7 mil (43.18 micrometers) dry thickness on a 1 mil (25.4 micrometers) 005-MSOL PET film backing using a knife coater followed by drying at 100° C. for 5 minutes.

Peel Adhesion Testing:

Tape strips of 1 inch (2.54 cm) width were tested for peel adhesion on horizontal stainless steel (SS) plate performed in constant temperature and humidity conditions of 23° C. and 50% RH, respectively. In dry surface conditions the tape was directly applied to the surface and rolled with 2 kilogram rubber roller. In the case of wet surface conditions, 0.3 ml of deionized water was spread over a 1 inch×4 inch (2.54 cm×10.16 cm) area and then the tape was applied over the wet area and rolled with the 2 kilogram rubber roller. The tape was inspected to make sure the water covered all of the area between surface and the tape. The tape was then left to dwell for few minutes (1 and 5 minutes, specifically). The tape was peeled at an angle of 180° at a peeling front speed of 12 inches per minute (30.48 cm per minute). The results of the peel adhesion testing are shown in Tables 4 and 5 below.

TABLE 4

Peel Adhesion Test Results Showing Effect of Dwell Time

| Description | Surface | Dwell time | 180° Peel (oz/in) | Standard Error |
|---|---|---|---|---|
| Control: RD 914 | Dry | — | 24.5 | 0.5 |
| Control: RD 914 | Wet | 1 min | 3.6 | 0.5 |
| Control: RD 914 | Wet | 5 min | 6.7 | 0.7 |
| RD 914 w particles (small, 50/50) | Dry | — | 24.6 | 0.2 |
| RD 914 w particles (small, 50/50) | Wet | 1 min | 9.6 | 1.3 |
| RD 914 w particles (small, 50/50) | Wet | 5 min | 15.9 | 0.6 |

TABLE 5

Peel Adhesion Test Results Showing Effect of Particle Type

| Description | Surface | Dwell time | 180° Peel (oz/in) | Standard Error |
|---|---|---|---|---|
| Control: RD 914 | Dry | — | 24.5 | 0.5 |
| Control: RD 914 | Wet | 5 min | 6.7 | 0.7 |
| RD 914 w particles (small, 50/50) | Dry | — | 24.6 | 0.2 |
| RD 914 w particles (small, 50/50) | Wet | 5 min | 15.9 | 0.6 |
| RD 914 w particles (small, all hydrophilic) | Dry | — | 15.8 | 0.2 |
| RD 914 w particles (small, all hydrophilic) | Wet | 5 min | 10.8 | 0.7 |

The data in Table 4 shows how the control sample of 3M FASTBOND 49 (without particles) has a large drop in adhesion to stainless steel in wet surface conditions, whereas the sample with the small, 50/50 hydrophilic/hydrophobic particles retained better adhesion under wet conditions. The longer the dwell time the better the adhesion became. The data in Table 5 shows the difference in performance in tapes that contained small 50/50 hydrophilic/hydrophobic particles and small all hydrophilic particles. The 50/50 particles adhered to stainless steel more strongly than the all hydrophilic particles, in both dry and wet conditions.

Example 4: Improved Adhesion to Wet Surfaces Using Nanoporous Microparticles Additives in Urethane Coatings Sample Preparation:

Large, 50/50 hydrophilic/hydrophobic particles (having an average particle size of 34±12 based on SEM image analysis) from Preparatory Example 1 were first mixed with Part A and then together mixed with Part B according to the formulation shown in Table 6 below. Four inch×four inch (10.16 cm×10.16 cm) steel plates were grit-blasted, and wet evenly by a certain amount of water. The urethane composites were coated on top of that surface, at a thickness of 0.8 millimeters by cast coating. Control samples of the same coating to non-wet substrates were carried out for comparison. Coatings were allowed to dry at room temperature for three days.

TABLE 6

Formulation of two-part polyurethane and nanoporous particles

| Particles | Mass (g) | Part A | Mass (g) | Part B | Mass (g) |
|---|---|---|---|---|---|
| Large 50/50 particles | 20 | DESMODUR W | 50 | CAPA 2043 | 70 |
| | | TOLONATE HDT-LV | 50 | CAPA 3031 | 30 |
| | | | | DBTDL | 0.02 |

Pull Adhesion Testing:

The adhesion strength of the coatings was measured by mechanical pull-off tests as described above in Example 2. The results of the pull adhesion test on these coatings are shown in Table 7 below in pounds per square inch (psi) and megapascals (MPa). Table 7 shows how the control sample of urethane (without particles) has a large drop in adhesion to stainless steel (from 706 psi to 224 psi) in wet surface conditions, whereas the sample with the large, 50/50 hydrophilic/hydrophobic particles retained better adhesion under wet conditions (628 psi to 458 psi) than the control sample without particles.

TABLE 7

The pull adhesion of urethane samples with and without large particles on dry and wet steel plate surface

| Sample | Amount of water on surface (mL) | Average of pull adhesion (psi) | Standard deviation (psi) |
|---|---|---|---|
| Urethane | 0 | 706 (4.87 MPa) | 110 (0.76 MPa) |
| Urethane w 10% particle | 0 | 628 (4.33 MPa) | 89 (0.61 MPa) |
| Urethane | 1 | 224 (1.54 MPa) | 56 (0.39 MPa) |
| Urethane w 10% particle | 1 | 458 (3.16 MPa) | 78 (0.54 MPa) |

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A composition comprising 1) an adhesive coating; and 2) porous polymeric particles disposed in the adhesive coating, wherein the porous polymeric particles comprise a polymerized product of a reaction mixture comprising:

a) a first phase comprising i) a compound of Formula (I)

$$HO(-CH_2-CH(OH)-CH_2-O)_n-H \quad\quad (I)$$

wherein n is an integer equal to at least 1; and ii) a nonionic surfactant;

b) a second phase dispersed in the first phase, wherein a volume of the first phase is greater than a volume of the second phase and wherein the second phase comprises i) a monomer composition comprising a monomer of Formula (II)

$$CH_2=C(R^1)-(CO)-O[-CH_2-CH_2-O]_p-(CO)-C(R^1)=CH_2 \quad\quad (II)$$

wherein is an integer equal to at least 1;

$R^1$ is a hydrogen or alkyl; and ii) a poly(propylene glycol) having a weight average molecular weight of at least 500 grams/mole, wherein the poly(propylene glycol) is removed from the polymerized product to provide the porous polymeric particles, wherein each of the porous polymeric particles comprises a plurality of primary particles joined together.

2. The composition of claim 1, wherein the porous polymeric particles are free of a coating applied to an exterior surface of the porous polymeric particles, are free of an active material loaded into the porous polymeric particles, or both.

3. The composition of claim 1, wherein the adhesive coating comprises an epoxy, an acrylic, a urethane, a silicone, a rubber, or a combination thereof.

4. The composition of claim 1, wherein the particles are disposed in the adhesive coating in a pattern.

5. An adhesive article comprising a substrate and a composition disposed on a first major surface of the substrate, the composition comprising 1) an adhesive; and 2) porous polymeric particles disposed in the adhesive, wherein the porous polymeric particles comprise a polymerized product of a reaction mixture comprising:

a) a first phase comprising i) a compound of Formula (I)

$$HO(-CH_2-CH(OH)-CH_2-O)_n-H \quad\quad (I)$$

wherein n is an integer equal to at least 1; and ii) a nonionic surfactant;

b) a second phase dispersed in the first phase, wherein a volume of the first phase is greater than a volume of the second phase and wherein the second phase comprises i) a monomer composition comprising a monomer of Formula (II)

$$CH_2=C(R^1)-(CO)-O[-CH_2-CH_2-O]_p-(CO)-C(R^1)=CH_2 \quad\quad (II)$$

wherein p is an integer equal to at least 1;

$R^1$ is a hydrogen or alkyl; and ii) a poly(propylene glycol) having a weight average molecular weight of at least 500 grams/mole, wherein the poly(propylene glycol) is removed from the polymerized product to provide the porous polymeric particles, wherein each of the porous polymeric particles comprises a plurality of primary particles joined together.

6. The adhesive article of claim 5, wherein the adhesive comprises a hot melt adhesive.

7. The adhesive article of claim 5, wherein the adhesive comprises a pressure sensitive adhesive.

8. The adhesive article of claim 5, further comprising a second composition disposed on a second major surface of the substrate.

9. A method of coating a substrate comprising:

a) providing a composition;

b) providing a substrate comprising a surface; and c) applying the composition on the surface of the substrate;

wherein the composition comprises 1) an adhesive coating; and 2) porous polymeric particles disposed in the adhesive coating, wherein the porous polymeric particles comprise a polymerized product of a reaction mixture comprising:

A) a first phase comprising i) a compound of Formula (I)

$$HO(-CH_2-CH(OH)-CH_2-O)_n-H \qquad \text{(I)}$$

wherein n is an integer equal to at least 1; and ii) a nonionic surfactant;

B) a second phase dispersed in the first phase, wherein a volume of the first phase is greater than a volume of the second phase and wherein the second phase comprises i) a monomer composition comprising a monomer of Formula (II)

$$CH_2=C(R^1)-(CO)-O[-CH_2-CH_2-O]_p- \\ (CO)-C(R^1)=CH_2 \qquad \text{(II)}$$

wherein p is an integer equal to at least 1;

$R^1$ is a hydrogen or alkyl; and ii) a poly(propylene glycol) having a weight average molecular weight of at least 500 grams/mole, wherein the poly(propylene glycol) is removed from the polymerized product to provide the porous polymeric particles, wherein each of the porous polymeric particles comprises a plurality of primary particles joined together.

10. The method of claim 9, wherein an ambient air temperature is less than 5 degrees Fahrenheit (about 2.8 degrees Celsius) above an ambient air dew point at the time of coating the composition on the surface of the substrate.

11. The method of claim 9, wherein water condensation is disposed on at least a portion of the surface of the substrate at the time of coating the composition on the surface of the substrate.

12. The method of claim 9, wherein standing water is disposed on at least a portion of the substrate of the substrate at the time of coating the composition on the surface of the substrate.

13. The method of claim 9, wherein the substrate is steel.

14. The method of claim 9, wherein the composition is part of an adhesive article, and the applying the composition on the surface of the substrate comprises contacting the adhesive article with the surface of the substrate.

* * * * *